(12) United States Patent
Adachi et al.

(10) Patent No.: US 10,452,351 B2
(45) Date of Patent: Oct. 22, 2019

(54) INFORMATION PROCESSING DEVICE AND INFORMATION PROCESSING METHOD

(71) Applicant: CLARION CO., LTD., Saitama (JP)

(72) Inventors: Maki Adachi, Saitama (JP); Takao Yahiro, Saitama (JP); Fukuya Iguchi, Saitama (JP); Kenta Yasutomo, Saitama (JP); Hiroshi Kato, Saitama (JP)

(73) Assignee: CLARION CO., LTD., Saitama-Shi, Saitama (JP)

( * ) Notice: Subject to any disclaimer, the term of this patent is extended or adjusted under 35 U.S.C. 154(b) by 44 days.

(21) Appl. No.: 15/556,487

(22) PCT Filed: Mar. 18, 2016

(86) PCT No.: PCT/JP2016/058828
§ 371 (c)(1),
(2) Date: Sep. 7, 2017

(87) PCT Pub. No.: WO2016/174955
PCT Pub. Date: Nov. 3, 2016

(65) Prior Publication Data
US 2018/0052658 A1 Feb. 22, 2018

(30) Foreign Application Priority Data
Apr. 28, 2015 (JP) ................................. 2015-091853

(51) Int. Cl.
*G06F 3/16* (2006.01)
*G06F 3/0488* (2013.01)
(Continued)

(52) U.S. Cl.
CPC ......... *G06F 3/167* (2013.01); *G01C 21/3608* (2013.01); *G06F 3/0488* (2013.01);
(Continued)

(58) Field of Classification Search
CPC .............................. G06F 3/0481; G06F 3/167
See application file for complete search history.

(56) References Cited

U.S. PATENT DOCUMENTS

2009/0182562 A1* 7/2009 Caire ................. G01C 21/3608
704/275
2011/0035207 A1* 2/2011 Abe .................... G06F 17/2735
704/2

(Continued)

FOREIGN PATENT DOCUMENTS

JP 2001-331192 A 11/2001
JP 2011-511935 A 4/2011

OTHER PUBLICATIONS

International Search Report issued for corresponding PCT/JP2016/058828 application.

(Continued)

*Primary Examiner* — Feng-Tzer Tzeng
(74) *Attorney, Agent, or Firm* — IP Business Solutions, LLC

(57) ABSTRACT

For an information processing device capable of accepting user's voice and executing processing based on the voice, convenience for a user is improved. A control portion 20 of an in-vehicle device 12 includes a non-voice operation mode and a voice operation mode as operation modes, and in the case that the operation mode is the non-voice operation mode, displays an operation button on a touch panel 26, and when it is detected that the operation button is operated, executes the processing corresponding to the operated operation button, and in the case that the operation mode is a voice operation mode M2, displays on the touch panel 26 an example phrase image indicating an example of a phrase to be uttered by the user in the case of making the processing corresponding to the operation button be executed instead of the operation button, and when voice data based on the (Continued)

phrase indicated by the example phrase image is generated, executes the processing corresponding to the operation button.

9 Claims, 10 Drawing Sheets

(51) Int. Cl.
| | |
|---|---|
| *G10L 15/00* | (2013.01) |
| *G10L 15/22* | (2006.01) |
| *G01C 21/36* | (2006.01) |
| *G06F 3/0484* | (2013.01) |
| *G06F 3/0481* | (2013.01) |
| *G10L 15/01* | (2013.01) |

(52) U.S. Cl.
CPC .......... *G06F 3/04842* (2013.01); *G10L 15/00* (2013.01); *G10L 15/005* (2013.01); *G10L 15/22* (2013.01); *G06F 3/0481* (2013.01); *G10L 15/01* (2013.01); *G10L 2015/223* (2013.01)

(56) References Cited

U.S. PATENT DOCUMENTS

| | | |
|---|---|---|
| 2011/0301958 A1 | 12/2011 | Brush et al. |
| 2014/0372892 A1 | 12/2014 | Payzer et al. |
| 2015/0371413 A1* | 12/2015 | Bahk .................. G06F 3/01 345/589 |

OTHER PUBLICATIONS

Written Opinion of the International Search Authority issued for corresponding PCT/JP2016/058828 application.
International Preliminary Report on Patentability issued for corresponding PCT/JP2016/058828.
Written Opinion of the International Search Authority issued for corresponding PCT/JP2016/058828.
Extended European Search Report issued for corresponding European Patent Application No. 16786232.5-1221/3291080 dated Dec. 3, 2018.

* cited by examiner

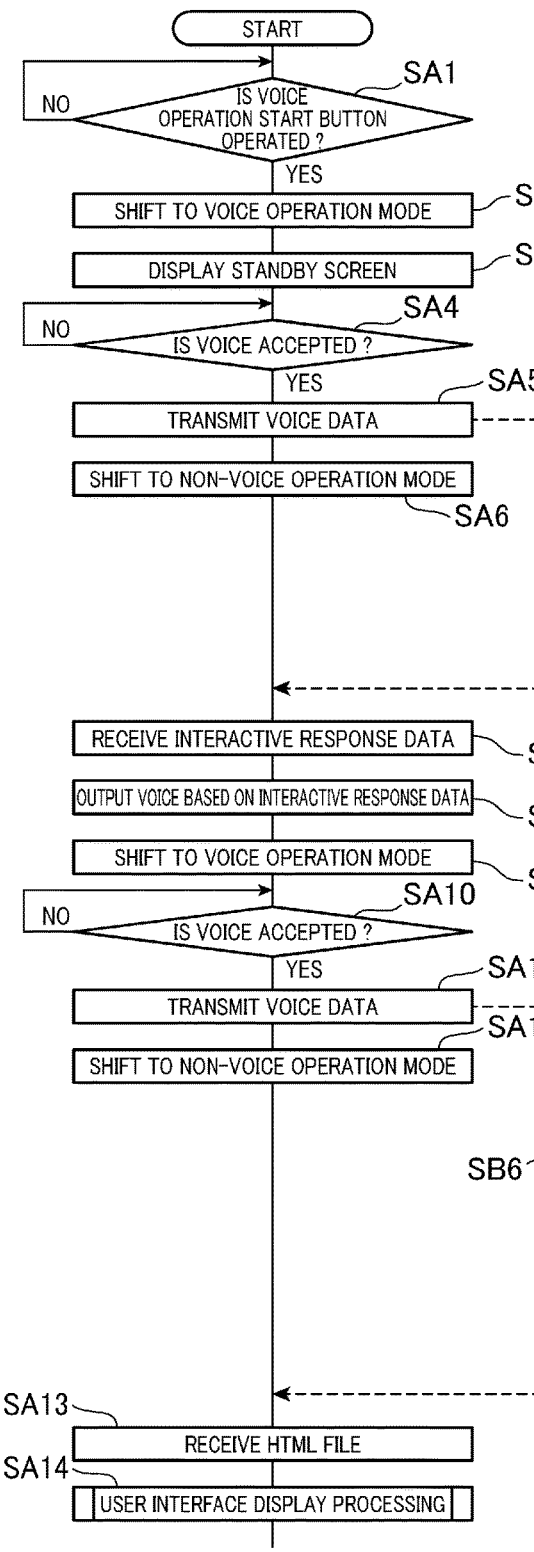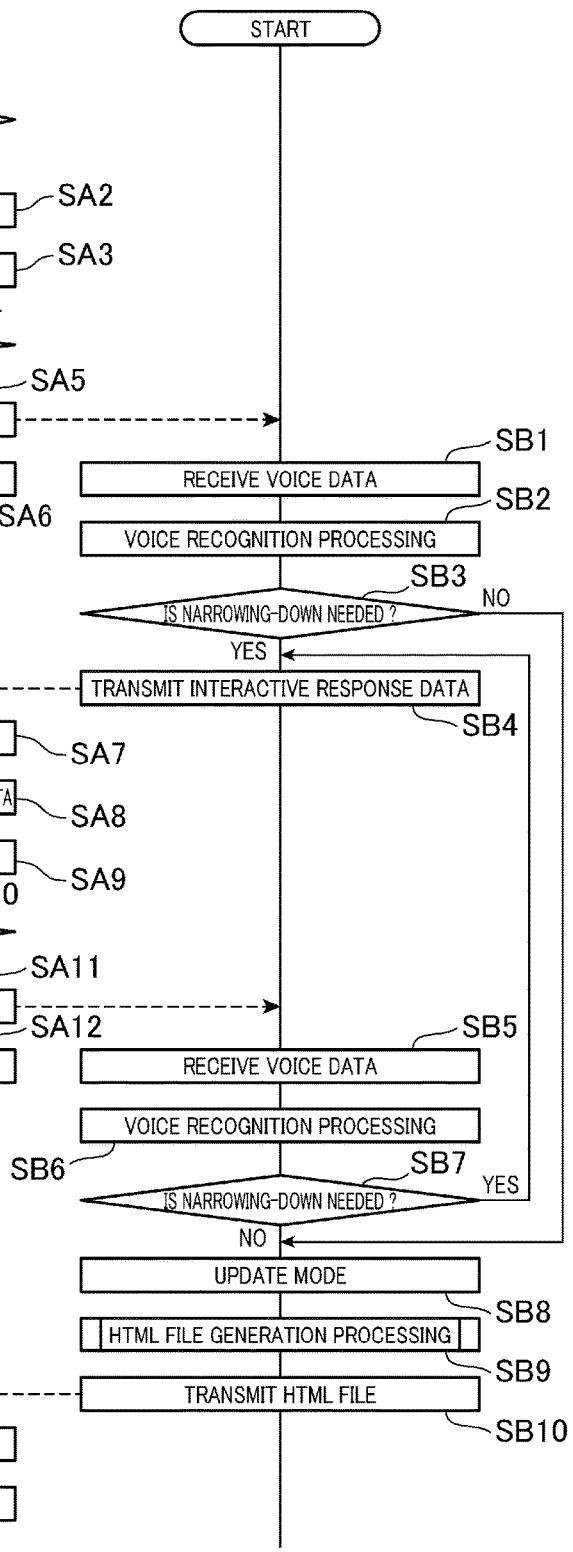

※ ⟨ ⟩ ENCIRCLED CHARACTER STRING IS DISPLAYED IN BLUE

FIG.6

| F1 | F2 | F3 | F4 | F5 |
|---|---|---|---|---|
| FACILITY NAME | FACILITY ADDRESS | FACILITY TELEPHONE NUMBER | FACILITY POSITION | FACILITY EVALUATION |
| ○○○⋯ | ○○○⋯ | ○○○⋯ | ○○○⋯ | ○○○⋯ |
| ○○○⋯ | ○○○⋯ | ○○○⋯ | ○○○⋯ | ○○○⋯ |

⋮

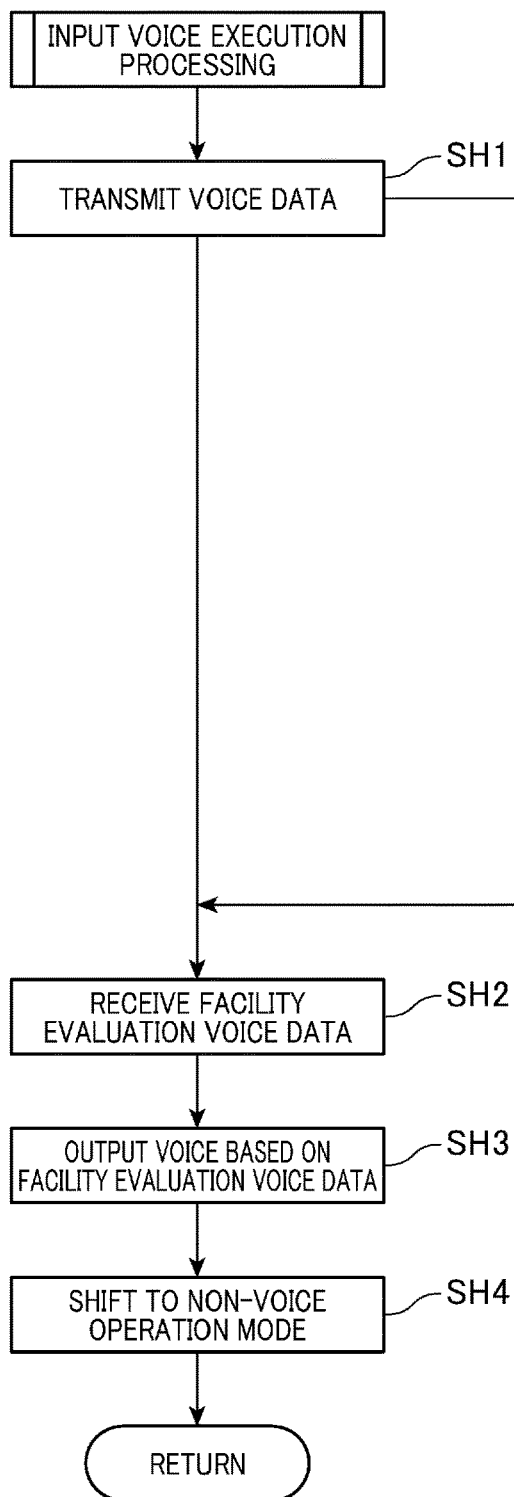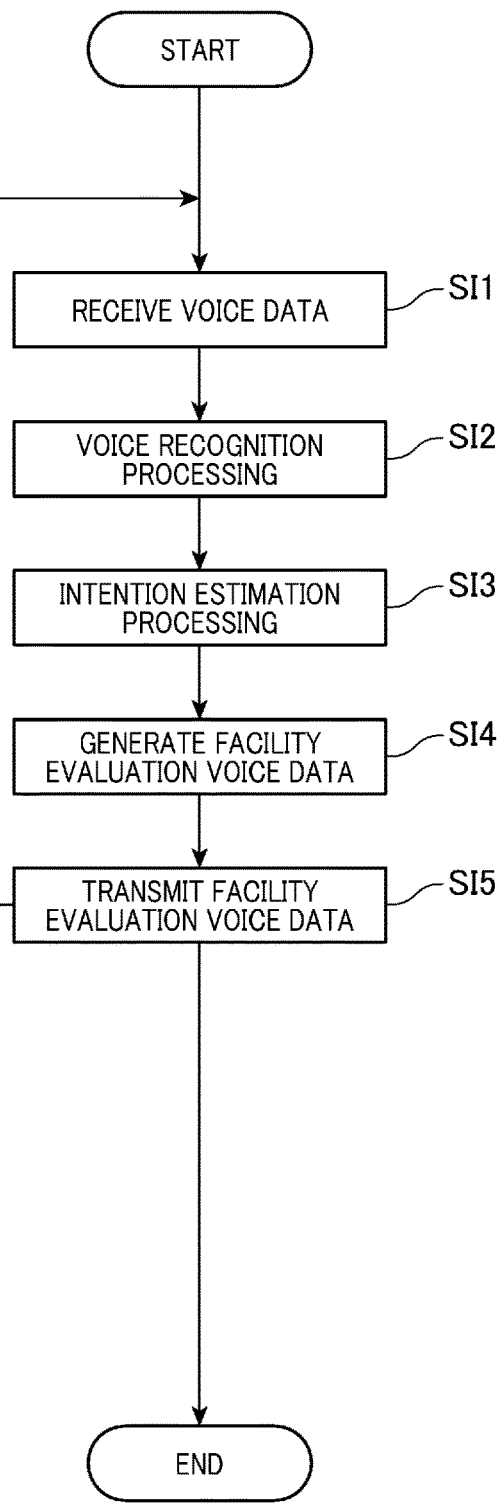

※ ⟨ ⟩ ENCIRCLED CHARACTER STRING IS DISPLAYED IN BLUE

INFORMATION PROCESSING DEVICE AND INFORMATION PROCESSING METHOD

TECHNICAL FIELD

The present invention relates to an information processing device and an information processing method.

BACKGROUND ART

Japanese Patent Laid-Open No.2001-331192 is a background art of the present technical field (Patent Literature 1). Japanese Patent Laid-Open No.2001-331192 discloses that "the device is provided with voice command emphasizing means 12 which selectively emphasizes only the words that are uttered as voice commands in the sentence of voice guidance and gives the words to the user."

CITATION LIST

Patent Literature

Patent Literature 1: Japanese Patent Laid-Open No.2001-331192

SUMMARY OF INVENTION

Technical Problem

However, in a configuration described in Patent Literature 1, the user needs to listen to the voice outputted by the device and then recognize the emphasized words from the voice that is listened to, in order to recognize the words that the user himself/herself can utter as the voice commands, and there is room for improving convenience for the user.

The present invention has been made in consideration of above-described circumstances, and an object of the present invention is to improve convenience for a user regarding an information processing device capable of accepting user's voice and executing processing based on the voice, and an information processing method including accepting user's voice and executing processing based on the voice.

Solution to Problem

In order to achieve the object, an information processing device includes: a touch panel; a voice processing portion that collects voice and generates voice data based on the collected voice; and a control portion that detects an operation to the touch panel and acquires the voice data generated by the voice processing portion, and the control portion is provided with a non-voice operation mode and a voice operation mode as operation modes, and in the case that the operation mode is the non-voice operation mode, displays an operation button on the touch panel, and when it is detected that the operation button is operated, executes processing corresponding to the operated operation button, and in the case that the operation mode is the voice operation mode, displays on the touch panel an example phrase image indicating an example of a phrase that a user is to utter to execute the processing corresponding to the operation button, instead of the operation button, and when the voice of the phrase indicated by the displayed example phrase image or a phrase based on the phrase indicated by the displayed example phrase image is collected and the voice data is generated by the voice processing portion, executes the processing corresponding to the operation button based on the generated voice data.

Advantageous Effect of Invention

According to the present invention, convenience for a user is improved.

BRIEF DESCRIPTION OF DRAWINGS

FIG. 3A is a flowchart illustrating an operation of an in-vehicle device,
and FIG. 3B is a flowchart illustrating an operation of a control server.
FIG. 6 is a diagram illustrating a facility database.
FIG. 9A is a flowchart illustrating an operation of the in-vehicle device,
and FIG. 9B is a flowchart illustrating an operation of the control server.

DESCRIPTION OF EMBODIMENT

Hereinafter, the embodiment of the present invention will be described with reference to the drawings.

Figure 1:
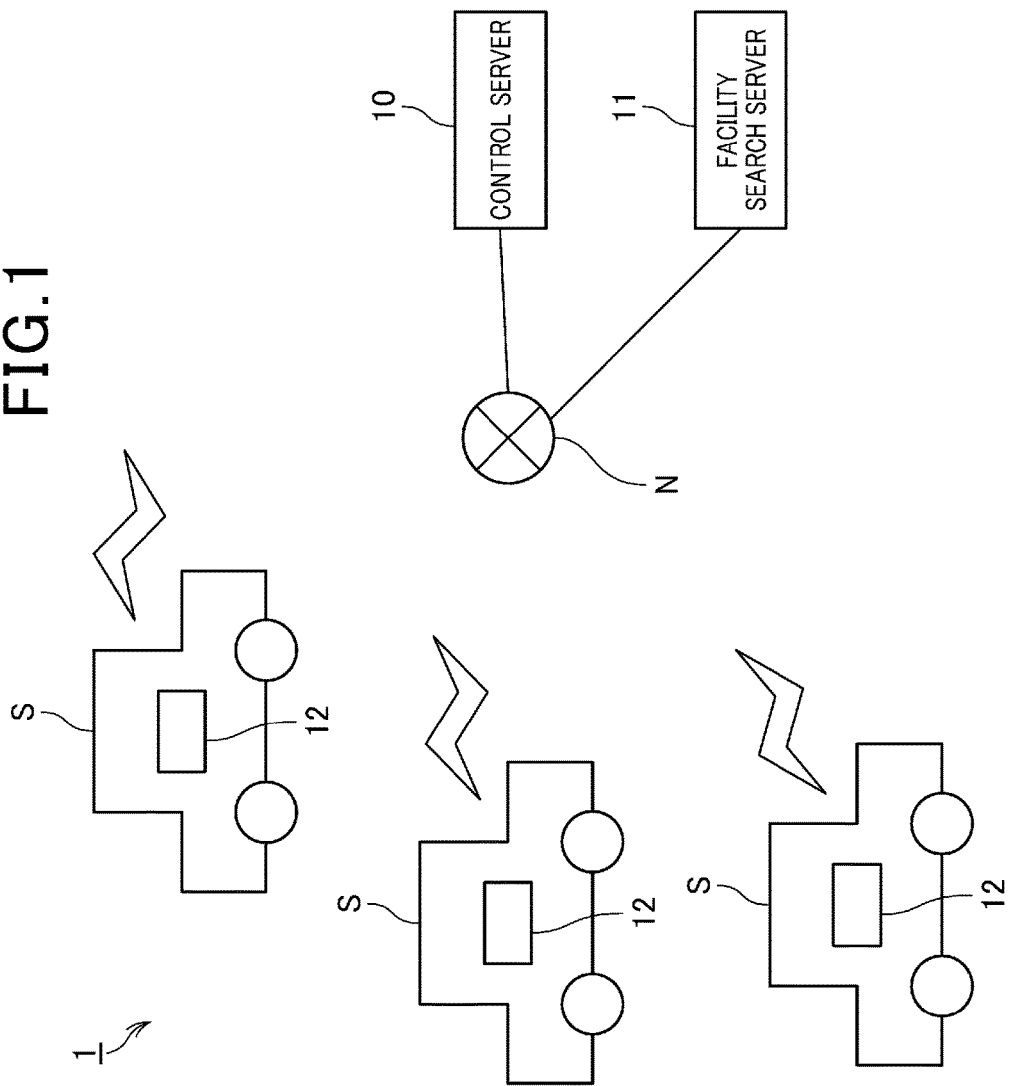
FIG. 1 is a diagram illustrating an information processing system relating to a present embodiment.

FIG. 1 is a diagram illustrating a configuration of an information processing system 1 relating to the present embodiment.

The information processing system 1 has, as described later, a function of recognizing voice uttered by a passenger boarding a vehicle S and executing processing corresponding to the voice.

As illustrated in FIG. 1, the information processing system 1 includes a control server 10 connected to a network N configured including the Internet and a telephone network. In addition, to the network N, a facility search server 11 is connected. Furthermore, the information processing system 1 includes an in-vehicle device 12 (information processing device) loaded in the vehicle S. The control server 10, the facility search server 11 and the in-vehicle device 12 are respectively communicable through the network N. The configuration, the function and the processing based on the function of the devices will be described later.

Figure 2:
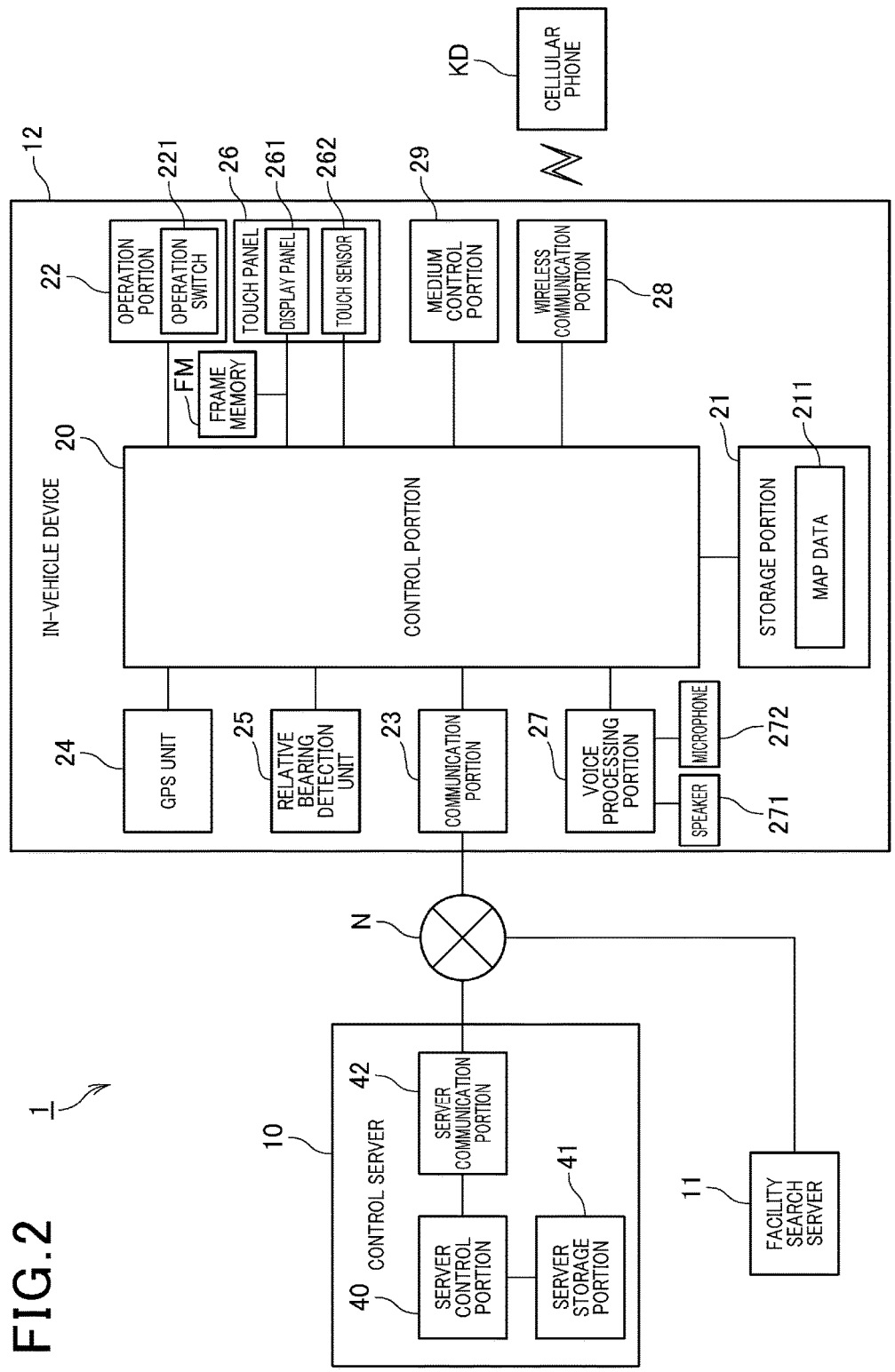
FIG. 2 is a block diagram illustrating a functional configuration of respective devices provided in the information processing system.

FIG. 2 is a block diagram illustrating a functional configuration of the in-vehicle device 12, the control server 10 and the facility search server 11.

The in-vehicle device 12 is a device loaded in the vehicle S. In addition to the function of executing the processing based on the voice uttered by the passenger of the vehicle S in cooperation with the control server 10 and the facility search server 11 as described above, the in-vehicle device 12 has a function of performing present vehicle position detection to detect a present position of the vehicle S, a function of performing vehicle position display to display the present position of the vehicle S on a map, a function of performing a route search to search a route to a destination, and a function of performing route guide to display the map, display the route to the destination on the map and guide the route to the destination, or the like.

As illustrated in FIG. 2, the in-vehicle device 12 includes a control portion 20, a storage portion 21, an operation portion 22, a communication portion 23, a GPS unit 24, a relative bearing detection unit 25, a touch panel 26, a voice processing portion 27, a wireless communication portion 28, and a medium control portion 29.

The control portion 20 includes a CPU, a ROM, a RAM and other peripheral circuits or the like, and controls respective portions of the in-vehicle device 12. The control portion 20 controls the respective portions of the in-vehicle device 12 by cooperation of hardware and software such as the CPU reading and executing a control program stored by the ROM.

To the in-vehicle device 12, a predetermined web browser is installed beforehand. By the function of the installed web browser, the control portion 20 can analyze an HTML (HyperText Markup Language) file and display an image based on an analysis result.

The storage portion 21 includes a nonvolatile memory, and stores various kinds of data. The storage portion 21 stores map data 211. The map data 211 includes drawing data relating to display of a map such as road drawing data relating to drawing of a shape of a road, background drawing data relating to the drawing of a background such as topography, and character string drawing data relating to the drawing of a character string of an administrative district or the like. In addition, the map data 211 includes information relating to a search of a route and guidance of the route, such as node information having information concerning a node corresponding to a connecting point in a road network like an intersection and link information having information concerning a link corresponding to a road formed between nodes.

The operation portion 22 includes an operation switch 221 provided on a housing of the in-vehicle device 12, detects an operation to the operation switch 221, and outputs a signal corresponding to the operation to the control portion 20. The control portion 20 executes processing corresponding to the operation, based on the signal inputted from the operation portion 22.

The communication portion 23 accesses the network N according to a predetermined communication standard according to control of the control portion 20, and communicates with devices (including the control server 10 and the facility search server 11) connected with the network N.

The GPS unit 24 receives a GPS radio wave from a GPS satellite through a GPS antenna not illustrated, and detects a present position and an advancing direction of the vehicle S by computation from a GPS signal superimposed on the GPS radio wave. The GPS unit 24 outputs a detection result to the control portion 20.

The relative bearing detection unit 25 includes a gyrosensor and an acceleration sensor. The gyrosensor is configured by an oscillation gyroscope for example, and detects a relative bearing (for example, a turning amount in a yawing axis direction) of the vehicle S. The acceleration sensor detects acceleration (for example, inclination of the vehicle S to the advancing direction) acting on the vehicle S. The relative bearing detection unit 25 outputs the detection result to the control portion 20.

The touch panel 26 includes a display panel 261, and a touch sensor 262.

The display panel 261 is a display device such as a liquid crystal display panel or an organic EL display panel. The control portion 20 develops image data of the image to be displayed on the display panel 261 in a frame memory FM, and based on the image data developed in the frame memory FM, drives the display panel 261, and displays the image on the display panel 261.

When a contact operation is performed to the touch panel 26, the touch sensor 262 outputs a signal indicating a position (referred to as "contact position," hereinafter) where the contact operation is performed to the control portion 20. The contact operation is an operation performed by contacting a predetermined position of the touch panel 26 by an indication body such as a fingertip. Note that some of capacitance type touch panels or the like detect the operation when the indication body gets close to the touch panel even when there is no physical contact of the indication body to the touch panel, and even the operation detected by such a method is included in a concept of the contact operation of the present embodiment. When the signal indicating the contact position is inputted from the touch sensor 262, the control portion 20 detects coordinates (referred to as "contact position coordinates," hereinafter) of the contact position in a predetermined coordinate system for expressing an arbitrary position in a display area of the display panel 261 by coordinates, based on the inputted signal. Processing that the control portion 20 detects the contact position coordinates relating to the contact position based on input from the touch sensor 262 corresponds to processing of detecting the operation to the touch panel 26.

The voice processing portion 27 is connected with a speaker 271, digital/analog converts a voice signal inputted from the control portion 20, adjusts a volume level, amplifies the voice signal, outputs the voice signal to the speaker 271, and outputs voice by the speaker 271.

The voice processing portion 27 is connected with a microphone 272, performs signal processing needed for the signal based on the voice collected by the microphone 272, performs analog/digital conversion, generates voice data, and outputs the voice data to the control portion 20.

The wireless communication portion 28 establishes a wireless communication link with an external device by a communication standard of wireless communication such as Bluetooth(R) according to the control of the control portion 20, and wirelessly communicates with the external device. Note that the communication standard used in the communication with the external device is not limited to Bluetooth, and may be a communication standard relating to other wireless communication such as the communication standard relating to a wireless LAN corresponding to an ad hoc mode or an infrastructure mode. Note that, while the in-vehicle device 12 wirelessly communicates with the external device in the present embodiment, the configuration may be such that the devices are cable-connected and the devices perform cable communication.

The wireless communication portion 28 is communicable with a cellular phone KD of the passenger boarding the vehicle S.

The cellular phone KD has a function of originating a call to another telephone, terminating a call from another telephone and communicating with another telephone, a function of accessing the Internet through a telephone line or the wireless LAN or the like, a function of receiving mail relating to SMS and mail such as web mail from a predetermined server and transmitting the mail to the predetermined server, and a function of receiving a message from the predetermined server and transmitting the message to the predetermined server by a function of a chat application or a messenger application or the like.

Note that, in the present embodiment, the in-vehicle device 12 may communicate with the external device having a function of accessing the network N such as the cellular phone KD, and access the network N through the external device.

The medium control portion 29 includes a drive that stores a medium such as a CD (Compact Disc) or a DVD (Digital Versatile Disk) and plays back the stored medium, generates the voice data based on information read from the medium according to playback of the medium, and outputs the voice data to the control portion 20.

As described above, the in-vehicle device 12 has the function of performing the present vehicle position detection to detect the present position of the vehicle S, the function of performing the vehicle position display to display the present position of the vehicle S on the map, the function of performing the route search to search the route to the destination, and the function of performing the route guide to display the map, display the route to the destination on the map and guide the route to the destination. Upon the present vehicle position detection, the control portion 20 detects the present position of the vehicle S, based on the input from the GPS unit 24 and the relative bearing detection unit 25 and the map data 211. Note that a method of detecting the present position of the vehicle S may be any methods, and upon the detection, information other than information exemplified in the present embodiment such as the information indicating a vehicle speed may be used. In addition, upon the vehicle position display, the control portion 20 displays the map of a predetermined scale centering on the detected present position on the touch panel 26 based on the map data 211, and also displays the detected present position of the vehicle S on the map. Furthermore, upon the route search, the control portion 20 searches the route from the detected present position to the destination set by a user, based on the map data 211. In addition, upon the route guide, the control portion 20 displays the route to the destination on the map, also displays the detected present position of the vehicle S on the map, and guides the route to the destination.

The control server 10 is a server, a client of which is the in-vehicle device 12. The control server 10 provides the in-vehicle device 12 with a service according to a request from the in-vehicle device 12 which is the client. While the control server 10 is expressed by one block in FIG. 1 and FIG. 2, the control server 10 does not need to be configured by a single server device, may be configured by a plurality of server devices, and may be a part of a predetermined system. That is, as long as the control server 10 has the function described below, the form may be any form.

As illustrated in FIG. 2, the control server 10 includes a server control portion 40, a server storage portion 41, and a server communication portion 42.

The server control portion 40 includes a CPU, a ROM, a RAM and other peripheral circuits or the like, and controls the respective portions of the control server 10. The server control portion 40 controls the respective portions of the control server 10 by the cooperation of the hardware and the software such as the CPU reading and executing a control program stored by the ROM.

The server storage portion 41 includes a nonvolatile memory, and stores various kinds of data.

The server communication portion 42 accesses the network N according to the predetermined communication standard according to the control of the server control portion 40, and communicates with the devices (including the in-vehicle device 12 and the facility search server 11) connected with the network N.

The facility search server 11 is a server having a function of, in the case of receiving a request of a response of a position of a corresponding facility including information concerning the facility such as a name of the facility and a kind of the facility from the control server 10, searching the position of the corresponding facility based on the information concerning the facility and responding.

Note that FIG. 2 is a schematic drawing illustrating the functional configuration of the respective devices of the information processing system 1 in classification according to main processing content, and the configuration of the in-vehicle device 12 can be classified into many more components according to the processing content. In addition, the configuration can be classified such that one component executes more processing. Furthermore, the processing of each component may be executed in a piece of the hardware or may be executed in a plurality of pieces of the hardware. In addition, the processing of each component may be realized by one program or may be realized by a plurality of programs.

As described above, in the information processing system 1, the in-vehicle device 12, the control server 10 and the facility search server 11 cooperate to recognize the voice uttered by the passenger boarding the vehicle S and execute the processing corresponding to the voice. Hereinafter, a series of the processing from recognition of the voice uttered by the passenger boarding the vehicle S to execution of the processing corresponding to the voice and accompanying processing are generically expressed as "voice corresponding processing."

Hereinafter, the operations of the in-vehicle device 12, the control server 10 and the facility search server 11 when executing the voice corresponding processing will be described.

FIGS. 3A and 3B are flowcharts illustrating the operations of the in-vehicle device 12 and the control server 10. FIG. 3A illustrates the operation of the in-vehicle device 12, and FIG. 3B illustrates the operation of the control server 10.

Here, the in-vehicle device 12 has, as operation modes, a non-voice operation mode M1, and a voice operation mode M2.

The non-voice operation mode M1 is the operation mode in which the in-vehicle device 12 does not accept the voice of the passenger. Therefore, in the case that the operation mode is the non-voice operation mode M1, the passenger cannot make the in-vehicle device 12 execute predetermined processing by voice utterance.

The voice operation mode M2 is, while details are to be described later, the operation mode in which the in-vehicle device 12 accepts the voice of the passenger and executes the processing based on the voice. Therefore, in the case that the operation mode is the voice operation mode M2, the passenger can make the in-vehicle device 12 execute the processing corresponding to the voice by uttering the voice.

In the following description, it is assumed that the operation mode of the in-vehicle device 12 is the non-voice operation mode M1 at a point of time of start in the flowchart in FIG. 3A.

In addition, the control server 10 has, as the operation modes, a normal mode M3, and a command receiving mode M4. The normal mode M3. and the command receiving mode M4 will be described later. In the following description, it is assumed that the operation mode of the control server 10 is the normal mode M3 at the point of time of the start in the flowchart in FIG. 3B.

As illustrated in FIG. 3A, the control portion 20 of the in-vehicle device 12 monitors whether or not a voice operation start button is operated (step SA1). The voice operation start button is a button that instructs shift of the operation mode from the non-voice operation mode M1 to the voice operation mode M2. The voice operation start button may be an operation button displayed on the touch panel 26, or may be a predetermined operation switch 221 provided on the housing of the in-vehicle device 12. Note that, in the present embodiment, "operation button" displayed on the touch panel 26 means an image to which the contact operation is possible such as an icon, and by performing the contact operation to the operation button, the passenger can make the in-vehicle device 12 execute the processing corresponding to the operation button. The control portion 20 manages coordinates of an area where the operation button is displayed in the above-described predetermined coordinate system (the coordinate system for expressing the arbitrary position in the display area (the area including the area where the contact operation is possible) of the display panel 261 by coordinates), and depending on a relation between the contact position coordinates detected based on the input from the touch sensor 262 and the coordinates of the area where the operation button is displayed, in the case that the contact operation is performed to the operation button by the passenger, detects that fact.

In the case that the voice operation start button is operated (step SA1: YES), the control portion 20 shifts the operation mode from the non-voice operation mode M1 to the voice operation mode M2 (step SA2).

Next, the control portion 20 displays a standby screen G1 on the touch panel 26 (step SA3).

Figure 4A:
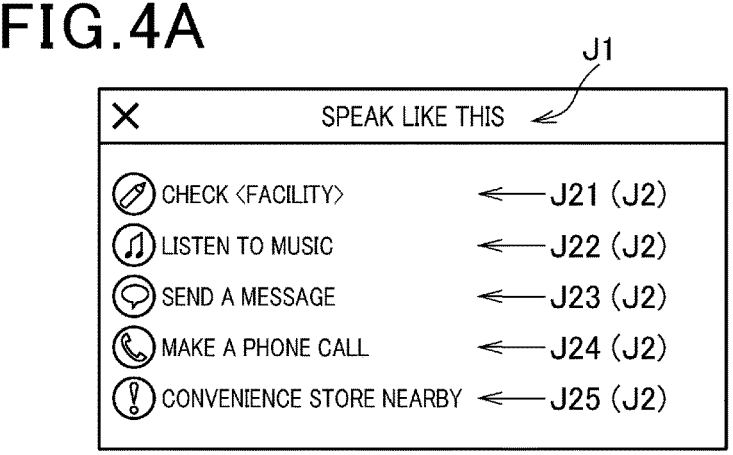
FIGS. 4A to 4C are diagrams illustrating a user interface displayed on a touch panel.

FIG. 4A is a diagram illustrating the standby screen G1.

As illustrated in FIG. 4A, at an upper part of the standby screen G1, information J1 urging the utterance of a phrase exemplified on the screen or a phrase based on the phrase exemplified on the screen (in FIG. 4A, a character string of "speak like this") is displayed.

On the standby screen G1, below the information J1, a plurality of pieces of information J2 (information J21-information J25) exemplifying the phrases to be uttered when the passenger makes the in-vehicle device 12 execute the predetermined processing are displayed.

The information J21 is the information exemplifying the phrase ("check <facility>") that the passenger is to utter in the case that the passenger makes acquisition and display of information concerning a predetermined facility on the map be executed. For example, when it is assumed that there is a facility called "Tokyo cherry tower" and the passenger desires to check Tokyo cherry tower, by referring to the information J2, the passenger can intuitively and easily recognize that the acquisition and display of the information concerning Tokyo cherry tower can be executed by uttering the phrase of "check Tokyo cherry tower" or the phrase (for example, "check on Tokyo cherry tower") based on the phrase.

The information J22 is the information exemplifying the phrase ("listen to music") that the passenger is to utter in the case that the passenger makes the playback of the medium (assumed to be the medium with music recorded thereon) stored in the medium control portion 29 be executed. By referring to the information J22, the passenger can intuitively and easily recognize that the playback of the medium can be executed by uttering the phrase of "listen to music" or the phrase (for example, "want to listen to music") based on the phrase.

The information J23 is the information exemplifying the phrase ("send a message") that the passenger is to utter in the case that the passenger makes transmission of a message from the cellular phone KD to the external device be executed. By referring to the information J23, the passenger can intuitively and easily recognize that the transmission of the message from the cellular phone KD to the external device can be executed by uttering the phrase of "send a message" or the phrase (for example, "want to send a message") based on the phrase. Note that, in the cellular phone KD, an application having a function of communicating with the in-vehicle device 12 and transmitting a message to the external device according to the control by the in-vehicle device 12 is installed.

The information J24 is the information exemplifying the phrase ("make a phone call") that the passenger is to utter in the case that the passenger makes call origination from the cellular phone KD to another telephone be executed. By referring to the information J24, the passenger can intuitively and easily recognize that the call origination from the cellular phone KD to another telephone can be executed by uttering the phrase of "make a phone call" or the phrase (for example, "want to make a phone call") based on the phrase. Note that, in the cellular phone KD, an application having a function of communicating with the in-vehicle device 12 and originating a call to another telephone according to the control by the in-vehicle device 12 is installed.

The information J25 is the information exemplifying the phrase ("a convenience store nearby") that the passenger is to utter in the case that the passenger makes a search of a convenience store positioned around the present position of the vehicle S be executed. By referring to the information J25, the passenger can intuitively and easily recognize that the search of the convenience store positioned around the present position of the vehicle S can be executed by uttering the phrase of "a convenience store nearby" or the phrase (for example, "go to a convenience store nearby") based on the phrase.

As above, by referring to the standby screen G1 displayed according to the operation of the voice operation start button, the passenger can intuitively and easily recognize what kind of phrases is to be uttered in the case of making the in-vehicle device 12 execute the predetermined processing.

Note that the information J2 exemplified on the standby screen G1 in FIG. 4A is one example. On the standby screen G1, the information exemplifying the phrases to be uttered according to the processing that can be made to be executed by the passenger by the utterance may be displayed.

The passenger refers to the standby screen G1 displayed on the touch panel 26, recognizes the information J2 corresponding to the processing desired to be executed by the in-vehicle device 12, and utters the phrase indicated by the information J2 or the phrase based on the phrase indicated by the information J2. For example, in the case of desiring the acquisition and display of the information concerning Tokyo cherry tower to be executed, the passenger utters the phrase of "check Tokyo cherry tower" or the phrase based on the phrase. The voice uttered by the passenger is collected by the microphone 272. The voice processing portion 27 generates the voice data based on the voice collected by the microphone 272, and outputs the voice data to the control portion 20.

After the standby screen G1 is displayed in step SA3, the control portion 20 monitors whether or not the voice based on the utterance of the passenger is accepted (step SA4). Specifically, the control portion 20 monitors whether or not the voice data is inputted from the voice processing portion 27.

In the case that the voice based on the utterance of the passenger is accepted (in the case that the voice data is inputted) (step SA4: YES), the control portion 20 controls the communication portion 23, and transmits the voice data to the control server 10 (step SA5). Note that the control portion 20 manages the information needed for communicating with the control server 10, such as an address of the control server 10, a protocol to be used in the communication, and a format of the data to be communicated.

After the voice data is transmitted, the control portion 20 shifts the operation mode from the voice operation mode M2 to the non-voice operation mode M1 (step SA6).

As illustrated in FIG. 3B, the server control portion 40 of the control server 10 controls the server communication portion 42, and receives the voice data (step SB1).

Next, the server control portion 40 executes voice recognition processing based on the received voice data (step SB2). In the voice recognition processing, the server control portion 40 converts the voice relating to the voice data into text based on the voice data, and generates text data (referred to as "voice text data," hereinafter) describing the text indicating the voice. For the conversion of the voice into the text based on the voice data, all existing techniques are available and it may be carried out by any method. In addition, the control server 10 itself does not need to convert the voice into the text based on the voice data, and the configuration may be such that the conversion of the voice data into the text is requested to the external device communicable with the control server 10.

Next, the server control portion 40 executes intention estimation processing based on the generated voice text data, and discriminates whether or not narrowing-down is needed, reflecting a processing result of the intention estimation processing (step SB3). The intention estimation processing is the processing of estimating what kind of the processing the phrase uttered as the voice by the passenger is intended to make the in-vehicle device 12 execute. For example, in the case of the phrase uttered as the voice based on the above-described information J21, the server control portion 40 estimates that it is the phrase uttered with an intention of making the acquisition and display of the information concerning a predetermined facility be executed, by analyzing the voice text data. For the intention estimation processing, all the existing techniques are available and it may be carried out by any method.

"Needing the narrowing-down" means that, in the case that the passenger utters a predetermined phrase by voice, in order for the in-vehicle device 12 to execute the processing based on the voice, the passenger needs to utter the phrase different from the predetermined phrase further. For example, it is assumed that the passenger utters "check Tokyo" as the phrase for a purpose of making the acquisition and display of the information concerning the predetermined facility be executed. In this case, since "Tokyo" does not indicate a specific facility and indicates a wide area, it cannot be set as the facility to be a target of acquiring the information. Therefore, the passenger needs to utter the phrase (for example, "check Tokyo cherry tower") that clarifies the facility more. Such a case corresponds to the case of "needing the narrowing-down." The server control portion 40 has a function of cooperating with the external device such as the facility search server 11 as needed and discriminating whether or not the narrowing-down is needed based on the text described in the voice text data.

In the case that the narrowing-down is not needed (step SB3: NO), the server control portion 40 shifts a processing procedure to step SB8. The processing of step SB8 and thereafter will be described later.

When the narrowing-down is needed (step SB3: YES), the server control portion 40 generates interactive response data, controls the server communication portion 42, and transmits the generated interactive response data to the in-vehicle device 12 (step SB4). The interactive response data is text data describing the text of the character string which suggests the phrase that the passenger is to utter in order to make the in-vehicle device 12 execute the predetermined processing to the passenger and urges the passenger to utter the phrase. For example, in the case that the passenger utters "check Tokyo" as the phrase for the purpose of making the in-vehicle device 12 execute the acquisition and display of the information concerning the predetermined facility so that the passenger needs to utter the phrase that clarifies the facility as the voice, the text data describing the text of the character string of "clarify the facility and speak again" corresponds to the interactive response data. The control portion 20 has a function of generating the corresponding interactive response data based on a result of analysis of the voice text data performed in step SB3.

As illustrated in FIG. 3A, the control portion 20 of the in-vehicle device 12 controls the communication portion 23, and receives the interactive response data (step SA7).

Next, the control portion 20 outputs the character string indicated by the text described in the interactive response data as the voice, based on the interactive response data (step SA8). Specifically, the control portion 20 generates the voice data (the data that waveforms of the voice of respective characters configuring the character string continue in order) of the character string indicated by the text, based on the text described in the interactive response data. For a method of generating the voice data based on the text, all the existing techniques are available and it may be carried out by any method. The voice processing portion 27 outputs the voice of the character string indicated by the text described in the interactive response data from the speaker 271, based on the voice signal inputted from the control portion 20.

The passenger can recognize that an appropriate phrase needs to be uttered as the voice again in order to make the in-vehicle device 12 execute the predetermined processing, by listening to the voice outputted from the in-vehicle device 12 in step SA8.

Next, the control portion 20 shifts the operation mode from the non-voice operation mode M1 to the voice operation mode M2 (step SA9). By the shift to the voice operation mode M2, a state that the voice uttered by the passenger is accepted by the in-vehicle device 12 is attained.

Next, the control portion 20 monitors whether or not the voice based on the utterance of the passenger is accepted (whether or not the voice data is inputted from the voice processing portion 27) (step SA10).

In the case that the voice based on the utterance of the passenger is accepted (in the case that the voice data is inputted) (step SA10: YES), the control portion 20 controls the communication portion 23, and transmits the voice data to the control server 10 (step SA11).

After the voice data is transmitted, the control portion 20 shifts the operation mode from the voice operation mode M2 to the non-voice operation mode M1 (step SA12).

As illustrated in FIG. 3B, the server control portion 40 of the control server 10 controls the server communication portion 42, and receives the voice data (step SB5).

Next, the server control portion 40 executes the voice recognition processing similar to that in step SB2, and generates the voice text data (step SB6).

Subsequently, the server control portion 40 analyzes the generated voice text data, and discriminates whether or not the narrowing-down is needed (step SB7).

In the case that the narrowing-down is not needed (step SB7: NO), the server control portion 40 shifts the processing procedure to step SB8. The processing of step SB8 and thereafter will be described later.

In the case that the narrowing-down is needed (step SB7: YES), the server control portion 40 returns the processing procedure to step SB4.

In this way, the in-vehicle device 12 and the control server 10 request the utterance of the appropriate phrase to the passenger until the narrowing-down is not needed anymore.

In step SB8, the server control portion 40 shifts the operation mode from the normal mode M3 to the command receiving mode M4 (step SB8). The normal mode M3 is the operation mode of recognizing the voice based on the voice uttered by the passenger and executing the corresponding processing based on the result of voice recognition in a normal form. The command receiving mode M4 is, while the details are to be described later, the operation mode of executing the processing corresponding to an example phrase image Y to be described later in the case that the passenger utters the voice based on the example phrase image Y. Note that, as to become clear later, the example phrase image Y is displayed on the touch panel 26 based on the HTML file generated by the server control portion 40 of the control server 10. Therefore, in the case of not transmitting the HTML file to display the example phrase image Y and not displaying the example phrase image Y on the touch panel 26, in step SB8, the server control portion 40 may not shift the operation mode to the command receiving mode M4 and may maintain the state that the operation mode is the normal mode M3.

Next, the server control portion 40 cooperates with the facility search server 11 as needed, and execute HTML file generation processing (step SB9). Hereinafter, HTML file preparation processing will be described with a specific example.

Figure 5A:
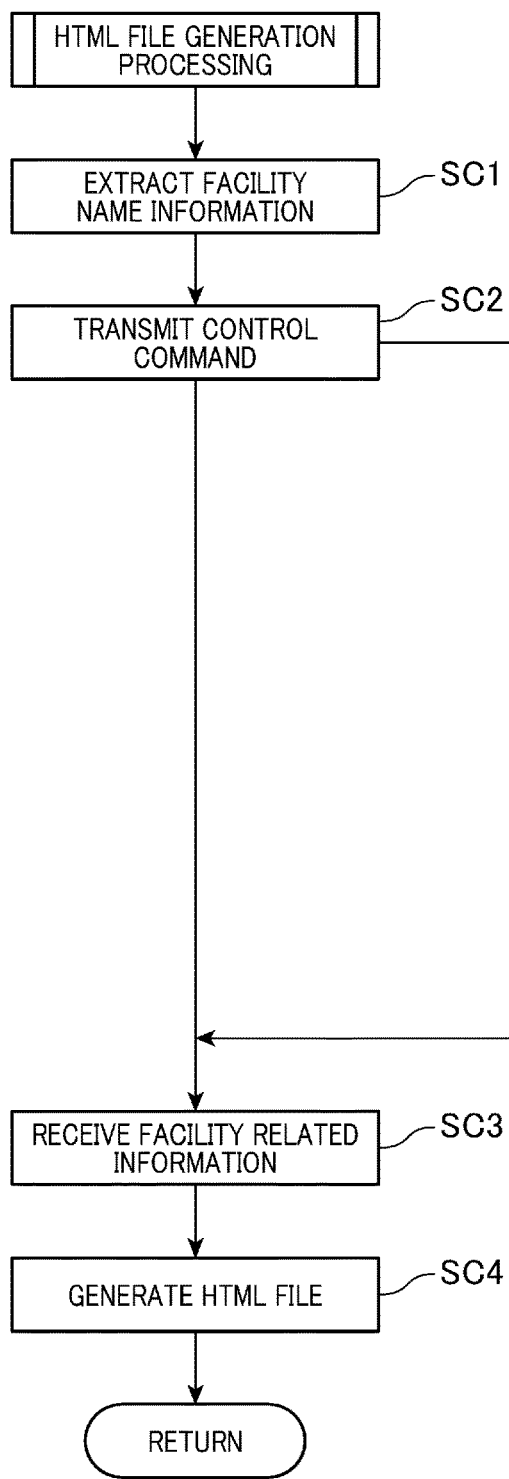
FIG. 5A is a flowchart illustrating an operation of the control server.
Figure 5B:
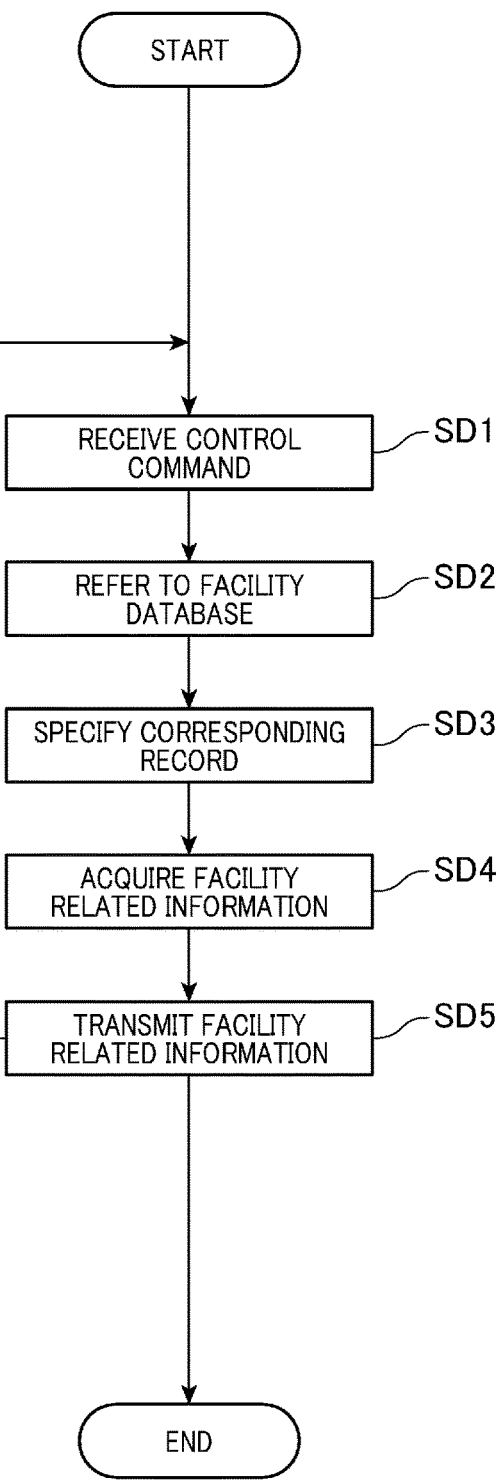
FIG. 5B is a flowchart illustrating an operation of a facility search server.

FIGS. 5A and 5B are flowcharts illustrating the operations of the control server 10 and the facility search server 11 in the case that the passenger utters the corresponding phrase by voice for the purpose of making the acquisition and display of the information concerning the predetermined facility be executed. FIG. 5A illustrates the operation of the control server 10, and FIG. 5B illustrates the operation of the facility search server 11.

Note that the server control portion 40 executes the processing in the flowchart in FIG. 5A, in the case of estimating that the utterance of the passenger is intended to make the acquisition and display of the information concerning the predetermined facility be executed in the intention estimation processing performed in step SB3 or step SB7.

As illustrated in FIG. 5A, the server control portion 40 extracts facility name information indicating a name of the facility (referred to as "facility name," hereinafter) from the text described in a voice text file (step SC1). In the voice text file generated based on the voice uttered by the passenger for the purpose of making the acquisition and display of the information concerning the predetermined facility be executed, the text (facility name information) indicating the facility name of the predetermined facility is included. For the processing in step SC1, all the existing techniques are available and it may be carried out by any method.

Next, the server control portion 40 generates a control command which includes the facility name information extracted in step SC1 and requests a response of the information concerning the facility of the facility name indicated by the facility name information, and transmits the control command to the facility search server 11 (step SC2).

As illustrated in FIG. 5B, the facility search server 11 receives the control command (step SD1).

Subsequently, the facility search server 11 refers to a facility database 111 (not illustrated in FIG. 1 and FIG. 2) (step SD2).

FIG. 6 is a diagram illustrating content of one record of the facility database 111.

The facility database 111 is a relational database including a record for each facility on the map. As illustrated in FIG. 6, one record of the facility database 111 includes a facility name field F1 where the facility name information is stored, a facility address field F2 where facility address information indicating an address of the facility is stored, a facility telephone number field F3 where facility telephone number information indicating a telephone number of the facility is stored, a facility position field F4 where facility position information (information including longitude and latitude and indicating the position of the facility on the map) indicating the position of the facility is stored, and a facility evaluation information field F5 where facility evaluation information to be described later is stored. That is, one record of the facility database 111 stores, for one facility, the facility name information, the facility address information, the facility telephone number information, the facility position information and the facility evaluation information relating to the one facility in correspondence.

In the following description, a combination of the facility name information, the facility address information, the facility telephone number information, the facility position information and the facility evaluation information is expressed as "facility related information."

The facility evaluation information is the information concerning evaluation of the facility. In the present embodiment, the facility evaluation information is the information including the evaluation (so-called word of mouth) that a predetermined website gathers from users of the Internet by a predetermined method. A server where the website is opened may be the facility search server 11 or may be a server other than the facility search server 11 including the control server 10. The facility search server 11 appropriately gathers the information concerning the evaluation of the facility by communicating with the server where the website is opened and the accompanying server or the like and gathers the information concerning the evaluation of the facility inputted from an operator of the server by predetermined means or the like to gather the information configuring the facility evaluation information, and appropriately updates the facility evaluation information of the corresponding record of the facility database 111.

Next, the facility search server 11 specifies the corresponding record of the facility database 111 with the facility name information included in the control command received in step SD1 as a key (step SD3).

Subsequently, the facility search server 11 acquires the facility related information (the facility name information, the facility address information, the facility telephone number information, the facility position information and the facility evaluation information) from the respective fields of the record specified in step SD3 (step SD4).

Next, the facility search server 11 transmits the facility related information acquired in step SD4 to the control server 10 (step SD5).

As illustrated in FIG. 5A, the server control portion 40 of the control server 10 controls the server communication portion 42, and receives the facility related information (step SC3).

Next, based on the facility related information received in step SC3, the server control portion 40 generates a non-voice operation mode corresponding HTML file D1 which is the HTML file relating to the display of a non-voice corresponding user interface GU1 to be described later, and a voice operation mode corresponding HTML file D2 which is the HTML file relating to the display of a voice corresponding user interface GU2 to be described later (step SC4). The non-voice operation mode corresponding HTML file D1 and the voice operation mode corresponding HTML file D2 will be described in details when describing images (the non-voice corresponding user interface GU1 and the voice corresponding user interface GU2) displayed based on the HTML files later.

For the HTML file generation processing in step SB9, while the operation of the control server 10 in the case that the passenger utters the corresponding phrase by voice for the purpose of making the acquisition and display of the information concerning the predetermined facility be executed is described as an example above, even in the case that the HTML file generation processing is executed based on the voice uttered by the passenger for other purposes, the server control portion 40 executes the similar processing. That is, in the HTML file generation processing, the server control portion 40 generates the HTML file to display a predetermined image corresponding to the intention of the passenger estimated by the intention estimation processing. Then, when preparing the HTML file, the server control portion 40 generates the HTML file (the non-voice operation mode corresponding HTML file D1) relating to the image displayed in the case that the operation mode of the in-vehicle device 12 is the non-voice operation mode M1, and the HTML file (the voice operation mode corresponding HTML file D2) relating to the image displayed in the case that the operation mode of the in-vehicle device 12 is the voice operation mode M2.

As illustrated in FIG. 3B, after executing the HTML file generation processing, the server control portion 40 of the control server 10 controls the server communication portion 42, and transmits the generated HTML files (the non-voice operation mode corresponding HTML file D1 and the voice operation mode corresponding HTML file D2) to the in-vehicle device 12 (step SB10).

As illustrated in FIG. 3A, the control portion 20 of the in-vehicle device 12 controls the communication portion 23, and receives the HTML files (step SA13).

Next, the control portion 20 executes user interface display processing (step SA14). Hereinafter, the user interface display processing will be described in details.

Figure 7:
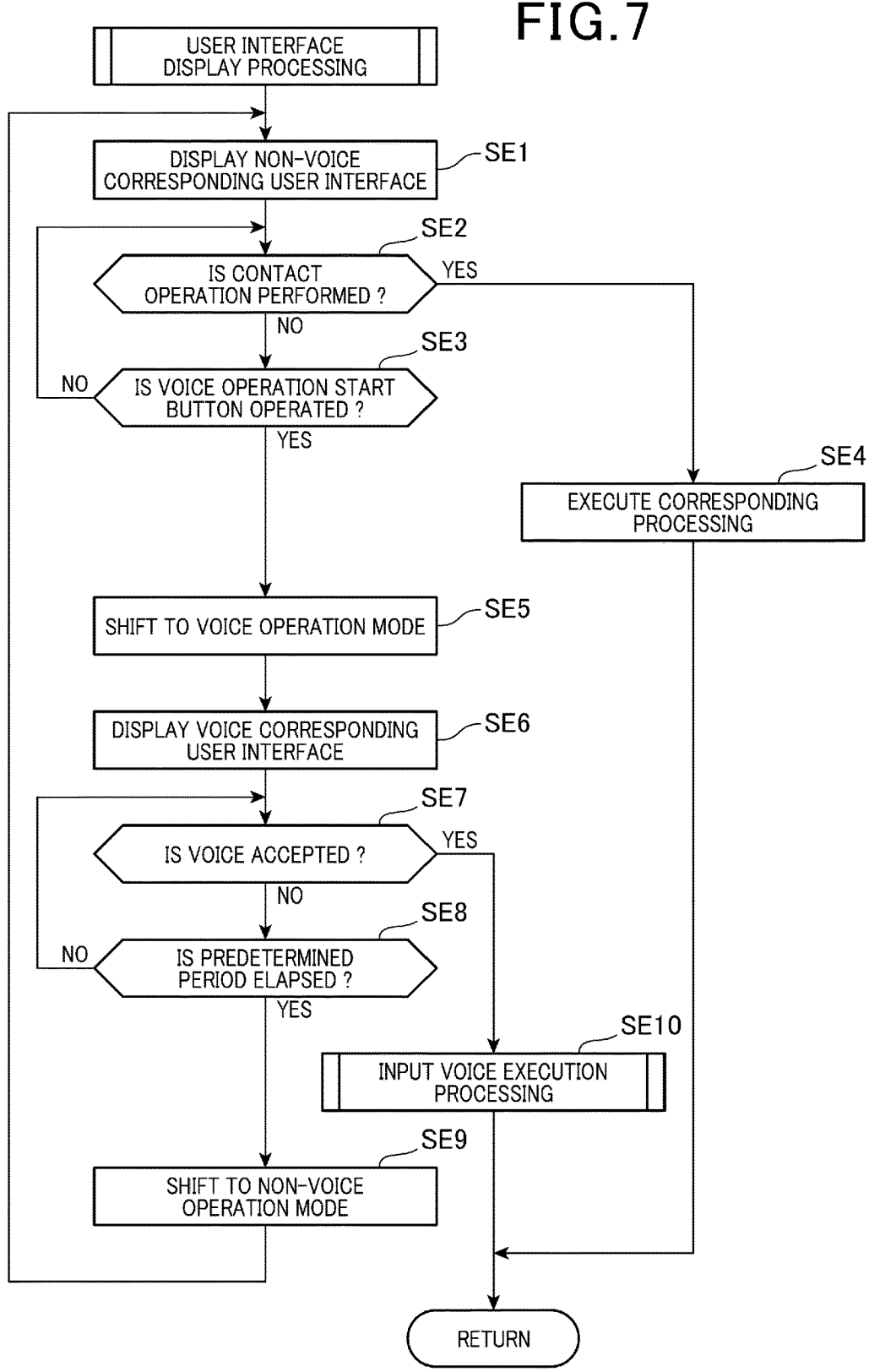
FIG. 7 is a diagram illustrating details of user interface display processing.

FIG. 7 is a flowchart illustrating details of the user interface display processing.

Note that, at the point of time of the start in the flowchart in FIG. 7, by the processing of step SA12 executed in advance, the operation mode of the in-vehicle device 12 is the non-voice operation mode M1.

As illustrated in FIG. 7, in the user interface display processing, the control portion 20 of the in-vehicle device 12 displays the non-voice corresponding user interface GU1 on the touch panel 26, based on the non-voice operation mode corresponding HTML file D1 which is the HTML file corresponding to the non-voice operation mode M1 which is the operation mode at the present point of time, between the two HTML files (the non-voice operation mode corresponding HTML file D1 and the voice operation mode corresponding HTML file D2) received from the control server 10 (step SE1). Note that, in each HTML file, the information indicating the operation mode that each HTML file corresponds is described as additional information corresponding to a predetermined tag, and the control portion 20 selects the HTML file corresponding to the operation mode at the present point of time between the two HTML files received from the control server 10, based on the additional information described in the HTML files. Hereinafter, the processing in step SE1 will be described in details.

Figure 4B:
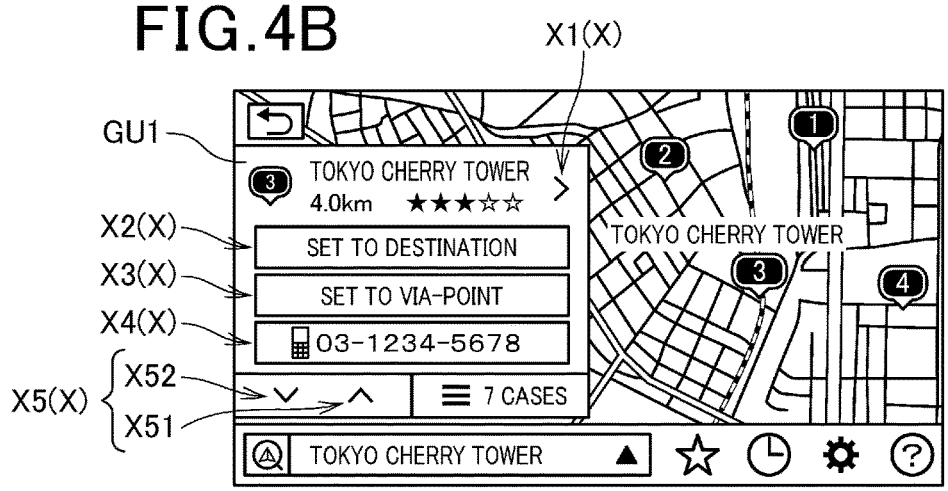

FIG. 4B is a diagram illustrating one example of the non-voice corresponding user interface GU1 based on the non-voice operation mode corresponding HTML file D1. The non-voice corresponding user interface GU1 exemplified in FIG. 4B illustrates the non-voice corresponding user interface GU1 based on the non-voice operation mode corresponding HTML file D1 generated based on the voice uttered by the passenger for the purpose of making the acquisition and display of the information concerning Tokyo cherry tower be executed. In FIG. 4B, on the touch panel 26, the map of the periphery of the Tokyo cherry tower is displayed, and also the non-voice corresponding user interface GU1 is superimposed on the map and displayed.

The non-voice corresponding user interface GU1 illustrated in FIG. 4B is a GUI (graphical user interface), and includes a plurality of operation buttons to which the contact operation can be performed. In the following description, the operation buttons displayed in the non-voice corresponding user interface GU1 are expressed as "non-voice corresponding operation buttons" and a sign X is attached in FIG. 4B.

When the non-voice corresponding user interface GU1 is described in details, at an upper part of the non-voice corresponding user interface GU1, the facility name of the corresponding facility (Tokyo cherry tower, in the present example) is displayed. In the non-voice corresponding user interface GU1, below an area where the facility name is displayed, a separation distance between the present position and the facility and the image expressing the evaluation of the facility by stars in five stages are displayed. In addition, in the non-voice corresponding user interface GU1, on the right of the area where the facility name is displayed, a detail button X1 which is a non-voice corresponding operation button X is displayed. By performing the contact operation to the detail button X1, the passenger can acquire the more detailed evaluation of the facility. Detailed description is omitted, however, in the case of detecting that the contact operation is performed to the detail button X1, the control portion 20 appropriately communicates with the control server 10, acquires the information concerning the more detailed evaluation of the facility, and displays the information in a predetermined mode.

In the non-voice corresponding user interface GU1, below the separation distance between the present position and the facility, a destination setting button X2 which is the non-voice corresponding operation button X is displayed. By performing the contact operation to the destination setting button X2, the passenger can make the route search with the facility as the destination and the route guide be executed. The detailed description is omitted, however, in the case of detecting that the contact operation is performed to the destination setting button X2, the control portion 20 appropriately communicates with the control server 10 to acquire the information concerning the facility needed for the route search, and then executes the route search and the route guide based on the map data 211.

In the non-voice corresponding user interface GU1, below the destination setting button X2, a via-point setting button X3 which is the non-voice corresponding operation button X is displayed. By performing the contact operation to the via-point setting button X3, the passenger can make the route search to a predetermined destination with the facility as a via-point and the route guide be executed. The detailed description is omitted, however, in the case of detecting that the contact operation is performed to the via-point setting button X3, the control portion 20 makes the passenger input the destination by predetermined means, appropriately communicates with the control server 10 to acquire the information concerning the facility needed for the route search, and then executes the route search to the destination with the facility as the via-point and the route guide based on the map data 211.

In the non-voice corresponding user interface GU1, below the via-point setting button X3, a telephone call origination button X4 which is the non-voice corresponding operation button X is displayed. By performing the contact operation to the telephone call origination button X4, the passenger can make a call be originated from the cellular phone KD to the facility. The detailed description is omitted, however, in the case of detecting that the contact operation is performed to the telephone call origination button X4, the control portion 20 appropriately communicates with the control server 10 to acquire the information needed for the call origination to the facility, controls the cellular phone KD through the wireless communication portion 28, and makes a call be originated from the cellular phone KD to the facility.

In the non-voice corresponding user interface GU1, below the telephone call origination button X4, a related facility display button X5 which is the non-voice corresponding operation button X is displayed. The related facility display button X5 is the non-voice corresponding operation button X to which the contact operation is performed in the case that the passenger makes the information concerning the facility (referred to as "related facility," hereinafter) related to the facility (referred to as "target facility," hereinafter) which is the target of the acquisition of the information and the display of the information be displayed. The related facility is the facility with some relation to the target facility such as being positioned in the periphery of the target facility and belonging to the same category as the target facility. As illustrated in FIG. 4B, the related facility display button X5 includes a next button X51 and a previous button X52. By performing the contact operation to the next button X51, the passenger can make the information concerning the related facility be displayed instead of the information concerning the facility (including the related facility) displayed at the present point of time. The information concerning the related facility is displayed in a mode similar to the non-voice corresponding user interface GU1 illustrated in FIG. 4B. In addition, by performing the contact operation to the previous button X52, the passenger can make the information concerning the facility (including the related facility) displayed before the facility (including the related facility) displayed at the present point of time be displayed instead of the information concerning the facility (including the related facility) displayed at the present point of time. The detailed description is omitted, however, in the case of detecting that the contact operation is performed to the related facility display button X5, the control portion 20 appropriately communicates with the control server 10 to acquire the information needed for the display of the information concerning the related facility, and displays the information in the predetermined mode.

On the right of the related facility display button X5, the number of the displayable related facilities is displayed.

In step SC4 described above, when generating the non-voice operation mode corresponding HTML file D1, the server control portion 40 of the control server 10 appropriately acquires the information (for example, the separation distance between the facility and the present position of the vehicle S, the information for expressing the evaluation of the facility by the stars, and the information concerning the related facility) needed for the display of the non-voice corresponding user interface GU1 by the predetermined means, and generates the non-voice operation mode corresponding HTML file D1 based on the facility related information.

In the case of displaying the non-voice corresponding user interface GU1 illustrated in FIG. 4B, the control portion 20 executes the following processing in step SE1. That is, the control portion 20 analyzes the non-voice operation mode corresponding HTML file D1 by the function of the web browser, and generates the image data of the non-voice corresponding user interface GU1. Then, the control portion 20 superimposes the generated image data on the already developed image data and develops the generated image data in a predetermined area of the frame memory FM. The non-voice operation mode corresponding HTML file D1 includes the information needed for generating the image data of the non-voice corresponding user interface GU1 illustrated in FIG. 4B. According to development of the image data of the non-voice corresponding user interface GU1 to the frame memory FM, the non-voice corresponding user interface GU1 is displayed in the corresponding area of the touch panel 26 (display panel 261).

As above, in the case that the operation mode is the non-voice operation mode M1, the control portion 20 displays the user interface (in the present example, the non-voice corresponding user interface GU1), based on the non-voice operation mode corresponding HTML file D1 received from the control server 10. The user interface displayed based on the non-voice operation mode corresponding HTML file D1 includes one or a plurality of non-voice corresponding operation buttons X to which the contact operation can be performed, as in the non-voice corresponding user interface GU1 exemplified in FIG. 4B, and the passenger can make the processing corresponding to the non-voice corresponding operation button X be executed, by performing the contact operation to the non-voice corresponding operation button X.

After the non-voice corresponding user interface GU1 is displayed based on the non-voice operation mode corresponding HTML file D1 in step SE1, the control portion 20 monitors whether or not the voice operation start button described above is operated (step SE3), while monitoring whether or not the contact operation is performed to the non-voice corresponding operation button X displayed in the user interface (step SE2).

In the case that the contact operation is performed to the non-voice corresponding operation button X of the non-voice corresponding user interface GU1 (step SE2; YES), the control portion 20 executes the processing corresponding to the non-voice corresponding operation button X to which the contact operation is performed (step SE4).

In the case that the contact operation is not performed to the non-voice corresponding operation button X of the non-voice corresponding user interface GU1 (step SE2: NO) and the voice operation start button is operated (step SE3: YES), the control portion 20 shifts the operation mode from the non-voice operation mode M1 to the voice operation mode M2 (step SE5).

Subsequently, the control portion 20 displays the voice corresponding user interface GU2 on the touch panel 26, based on the voice operation mode corresponding HTML file D2 which is the HTML file corresponding to the voice operation mode M2 which is the operation mode at the present point of time, between the two HTML files (the non-voice operation mode corresponding HTML file D1 and the voice operation mode corresponding HTML file D2) received from the control server 10 (step SE6). Hereinafter, the processing in step SE6 will be described in details.

Figure 4C:
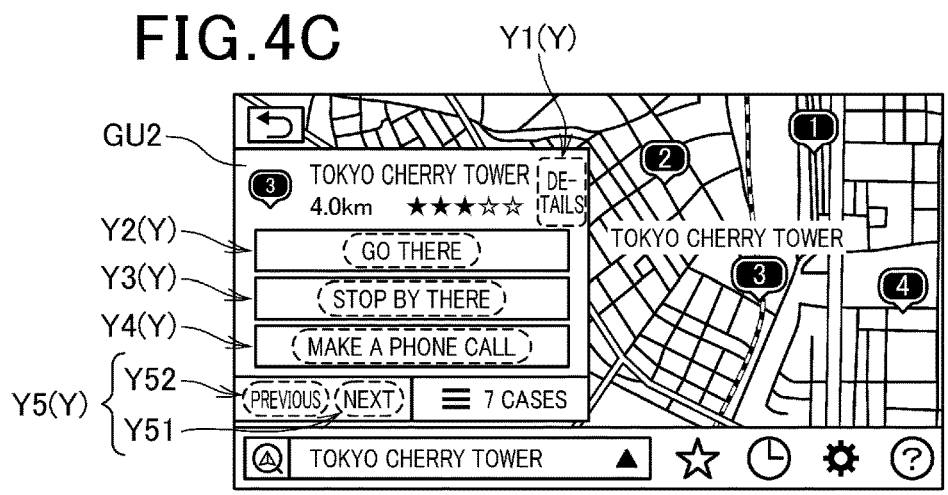

FIG. 4C is a diagram illustrating one example of the voice corresponding user interface GU2 based on the voice operation mode corresponding HTML file D2. The voice corresponding user interface GU2 exemplified in FIG. 4C illustrates the voice corresponding user interface GU2 based on the voice operation mode corresponding HTML file D2 generated based on the voice uttered by the passenger for the purpose of making the acquisition and display of the information concerning Tokyo cherry tower be executed. That is, the voice corresponding user interface GU2 exemplified in FIG. 4C illustrates the voice corresponding user interface GU2 displayed instead of the non-voice corresponding user interface GU1 by the voice operation start button being operated in the state that the non-voice corresponding user interface GU1 exemplified in FIG. 4B is displayed.

As it is clear by comparison between FIG. 4B and FIG. 4C, in the voice corresponding user interface GU2, each of the example phrase images Y is displayed at the position corresponding to each of the non-voice corresponding operation buttons X in the non-voice corresponding user interface GU1. The example phrase image Y is the image indicating an example of the phrase that the passenger is to utter in the case that the passenger makes the same processing as the processing executed by the in-vehicle device 12 when the contact operation is performed to the non-voice corresponding operation button X displayed at the corresponding position in the non-voice corresponding user interface GU1 be executed.

In FIG. 4C, a detail example phrase image Y1 is the example phrase image Y displayed at the position corresponding to the detail button X1 in FIG. 4B, and expresses the character string of "detail." The detail example phrase image Y1 indicates that the passenger is to utter the phrase of "detail" or the phrase based on the phrase of "detail" as the voice in the case of making the processing of displaying the information concerning the more detailed evaluation of the facility (the processing executed when the contact operation is performed to the detail button X1) be executed.

In addition, in FIG. 4C, a destination setting example phrase image Y2 is the example phrase image Y displayed at the position corresponding to the destination setting button X2 in FIG. 4B, and expresses the character string of "go there." The destination setting example phrase image Y2 indicates that the passenger is to utter the phrase of "go there" or the phrase based on the phrase of "go there" as the voice in the case of making the route search with the facility as the destination and the route guide (the processing executed when the contact operation is performed to the destination setting button X2) be executed.

Furthermore, in FIG. 4C, a via-point setting example phrase image Y3 is the example phrase image Y displayed at the position corresponding to the via-point setting button X3 in FIG. 4B, and expresses the character string of "stop by there." The via-point setting example phrase image Y3 indicates that the passenger is to utter the phrase of "stop by there" or the phrase based on the phrase of "stop by there" as the voice in the case of making the route search to the predetermined destination with the facility as the via-point and the route guide (the processing executed when the contact operation is performed to the via-point setting button X3) be executed.

In addition, in FIG. 4C, a telephone call origination example phrase image Y4 is the example phrase image Y displayed at the position corresponding to the telephone call origination button X4 in FIG. 4B, and expresses the character string of "make a phone call." The telephone call origination example phrase image Y4 indicates that the passenger is to utter the phrase of "make a phone call" or the phrase based on the phrase of "make a phone call" as the voice in the case of making the processing of originating a call from the cellular phone KD to the facility (the processing executed when the contact operation is performed to the telephone call origination button X4) be executed.

Furthermore, in FIG. 4C, a related facility display example phrase image Y5 is the example phrase image Y displayed at the position corresponding to the related facility display button X5 in FIG. 4B. As illustrated in FIG. 4C, the related facility display example phrase image Y5 includes a next example phrase image Y51 displayed at the position corresponding to the next button X51 in FIG. 4B, and a previous example phrase image Y52 displayed at the position corresponding to the previous button X52.

The next example phrase image Y51 expresses the character string of "next." The next example phrase image Y51 indicates that the passenger is to utter the phrase of "next" or the phrase based on the phrase of "next" as the voice in the case of making the processing of displaying the information concerning the related facility instead of the information concerning the facility (including the related facility) displayed at the present point of time (the processing executed when the contact operation is performed to the next button X51) be executed. The previous example phrase image Y52 expresses the character string of "previous." The previous example phrase image Y52 indicates that the passenger is to utter the phrase of "previous" or the phrase based on the phrase of "previous" as the voice in the case of making the processing of displaying the information concerning the facility (including the related facility) displayed before the facility (including the related facility) displayed at the present point of time (the processing executed when the contact operation is performed to the previous button X52) be executed.

As illustrated in FIG. 4C, the character string indicated by each of the example phrase images Y is expressed in a specific color (blue, in the example in FIG. 4C), and the character strings other than the character strings indicated by the example phrase images Y are expressed in a color other than the specific color. Thus, the following effect is demonstrated. That is, the passenger can intuitively and easily recognize whether or not the character string indicates the example of the phrase to be uttered in the case of making the predetermined processing be executed.

Further, as illustrated in FIG. 4C, each of the example phrase images Y in the voice corresponding user interface GU2 is displayed at the position corresponding to the position where each of the corresponding non-voice corresponding operation buttons X in the non-voice corresponding user interface GU1 is displayed. Thus, the following effect is demonstrated. That is, as described above, the voice corresponding user interface GU2 is displayed instead of the non-voice corresponding user interface GU1 according to the shift of the operation mode by the operation of the voice operation start button by the passenger. Then, since each of the example phrase images Y in the voice corresponding user interface GU2 and each of the corresponding non-voice corresponding operation buttons X in the non-voice corresponding user interface GU1 are displayed at the corresponding position in the respective user interfaces, the passenger can intuitively and easily recognize a relation between the non-voice corresponding operation button X and the example phrase image Y that make the same processing be executed, even when the user interface is changed, and a possibility of the utterance of an erroneous phrase can be reduced.

Furthermore, as illustrated in FIG. 4B, the character string indicated by the non-voice corresponding operation button X is the character string expressing the processing to be executed when the button is operated by a written language. On the other hand, as shown in FIG. 4C, the character string indicated by the example phrase image Y is the character string expressing the phrase to be uttered in the case of making the corresponding processing be executed by a spoken language (colloquial expression). That is, the phrase corresponding to the character string indicated by the example phrase image Y is the phrase that is easy for the passenger to utter, and the passenger can smoothly utter the phrase for making the predetermined processing be executed by referring to the example phrase image Y.

In the case of displaying the voice corresponding user interface GU2 illustrated in FIG. 4C, in step SE6, the control portion 20 executes the following processing. That is, the control portion 20 analyzes the voice operation mode corresponding HTML file D2 by the function of the web browser, and generates the image data of the voice corresponding user interface GU2. Then, the control portion 20 superimposes the generated image data on the already developed image data and develops the generated image data in the predetermined area of the frame memory FM. According to the development of the image data of the voice corresponding user interface GU2 to the frame memory FM, the voice corresponding user interface GU2 is displayed in the corresponding area of the touch panel 26 (display panel 261).

After the voice corresponding user interface GU2 is displayed in step SE6, the control portion 20 monitors whether or not a predetermined period (one minute, for example) elapses after shifting the operation mode to the voice operation mode M2 (step SE8), while monitoring whether or not the voice based on the utterance of the passenger is accepted (whether or not the voice data is inputted from the voice processing portion 27) (step SE7).

In the case that the voice is not accepted (step SE7: NO) and the predetermined period elapses (step SE8: YES), the control portion 20 shifts the operation mode from the voice operation mode M2 to the non-voice operation mode M1 (step SE9), and returns the processing procedure to step SE1.

On the other hand, in the case that the voice is accepted before the predetermined period elapses (in the case that the voice data is inputted) (step SE7: YES), the control portion 20 executes input voice execution processing (step SE10).

Hereinafter, the input voice execution processing will be described with two cases of a case C1 and a case C2 as examples. The case C1 is the case that the phrase indicated by the telephone call origination example phrase image Y4 or the phrase based on the phrase indicated by the telephone call origination example phrase image Y4 is uttered by the passenger in the state that the voice corresponding user interface GU2 exemplified in FIG. 4C is displayed. The case C2 is the case that the phrase indicated by the detail example phrase image Y1 or the phrase based on the phrase indicated by the detail example phrase image Y1 is uttered by the passenger in the state that the voice corresponding user interface GU2 exemplified in FIG. 4C is displayed.

<Case C1>

Figure 8A:
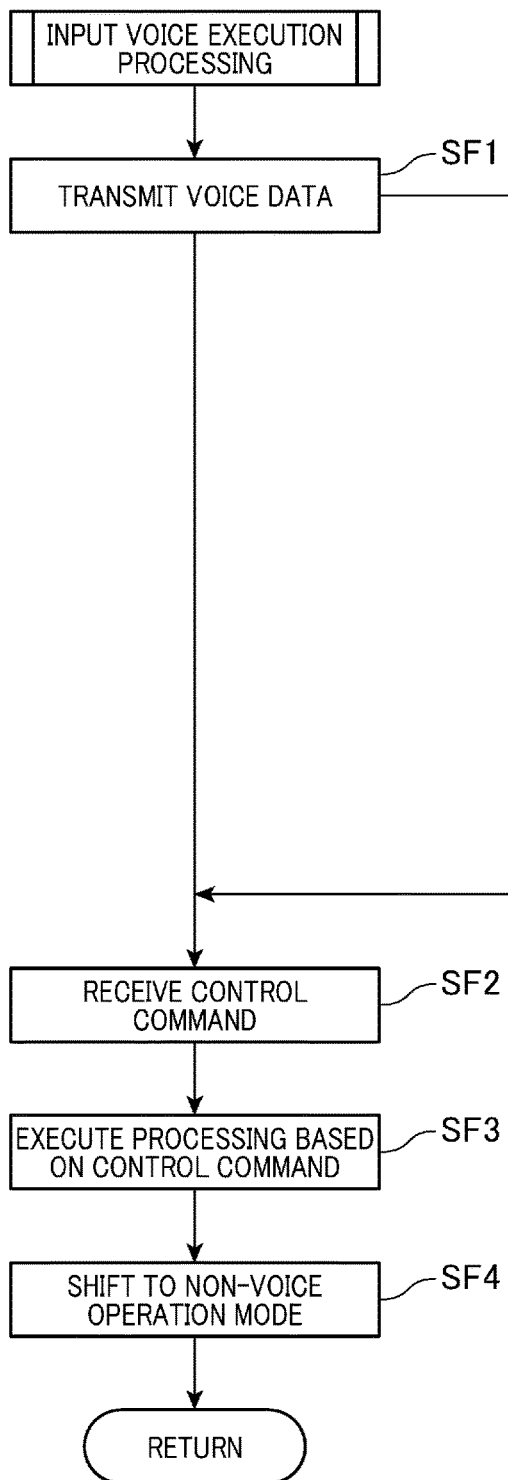
FIG. 8A is a flowchart illustrating an operation of the in-vehicle device.
Figure 8B:
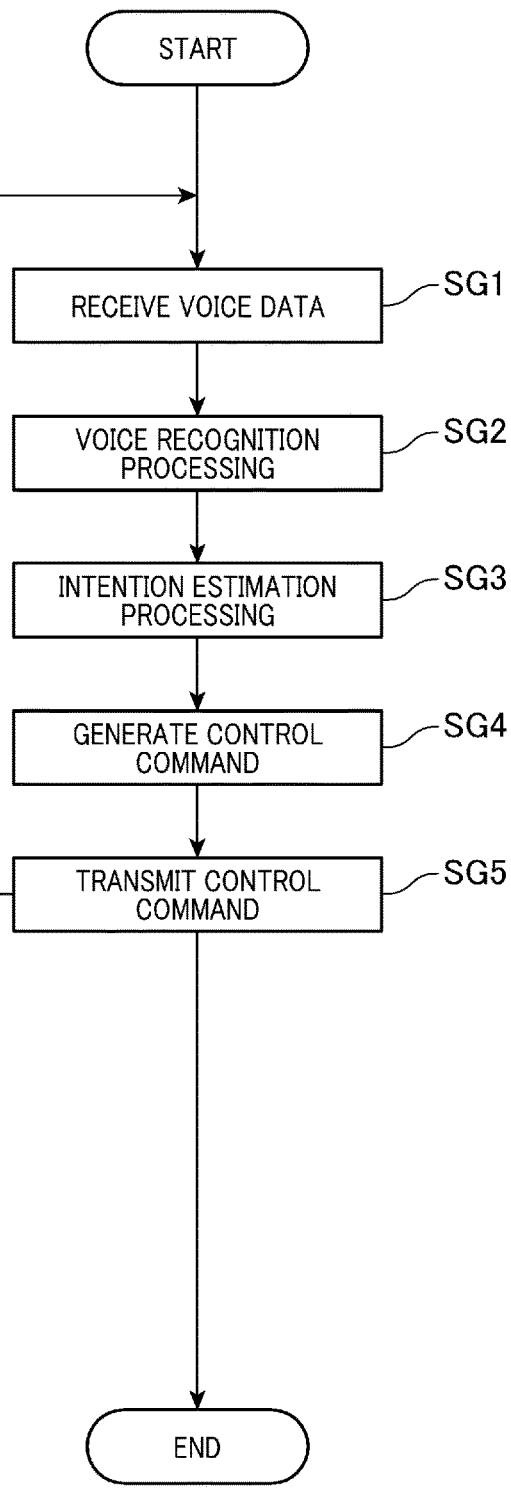
FIG. 8B is a flowchart illustrating an operation of the control server.

FIGS. 8A and 8B are flowcharts illustrating the operations of the in-vehicle device 12 and the control server 10 when executing the input voice execution processing in the case that the phrase indicated by the telephone call origination example phrase image Y4 or the phrase based on the phrase indicated by the telephone call origination example phrase image Y4 is uttered by the passenger in the state that the voice corresponding user interface GU2 exemplified in FIG. 4C is displayed. FIG. 8A is the flowchart illustrating the operation of the in-vehicle device 12, and FIG. 8B is the flowchart illustrating the operation of the control server 10.

As illustrated in FIG. 8A, the control portion 20 of the in-vehicle device 12 controls the communication portion 23, and transmits the voice data inputted from the voice processing portion 27 to the control server 10 (step SF1). In the case of the present example, the voice data is generated based on the utterance by the passenger of the phrase indicated by the telephone call origination example phrase image Y4 or the phrase based on the phrase indicated by the telephone call origination example phrase image Y4.

As illustrated in FIG. 8B, the server control portion 40 of the control server 10 controls the server communication portion 42, and receives the voice data (step SG1).

Next, the server control portion 40 executes the voice recognition processing based on the received voice data, and generates the voice text data (step SG2).

Subsequently, the server control portion 40 analyzes the generated voice text data, and executes the intention estimation processing (step SG3). Here, by the processing in step SB8 executed in advance, the operation mode of the control server 10 is the command receiving mode M4. In the case of the command receiving mode M4, the server control portion 40 can discriminate based on which example phrase image Y of the example phrase images Y displayed in the voice corresponding user interface GU2 the passenger utters the voice, based on the text described in the voice text data. That is, the server control portion 40 can manage correspondence between the example phrase image Y displayed in the user interface based on the HTML file and the phrase indicated by the image for the voice operation mode corresponding HTML file D2 generated by itself, and discriminate based on which example phrase image Y the utterance is performed based on the phrase indicated by the text described in the voice text data. In the intention estimation processing in step SG3, the control portion 20 discriminates based on which the example phrase image Y the utterance is performed by the passenger, based on the text described in the voice text data, and estimates what kind of the processing the phrase uttered as the voice by the passenger is intended to make the in-vehicle device 12 execute, based on a discrimination result.

In the present example, in step SG3, the server control portion 40 analyzes the voice text data, discriminates that the utterance based on the telephone call origination example phrase image Y4 is performed by the passenger, and estimates that the utterance is performed by the passenger with the intention of originating a call with the telephone number of the facility as the destination by the cellular phone KD.

After the intention estimation processing is executed in step SG3, the server control portion 40 generates the control command to execute the processing according to the intention of the passenger estimated in step SG3 (step SG4). In the case of the present example, in step SG4, the server control portion 40 generates the control command to control the cellular phone KD and make the cellular phone KD originate a call with the telephone number of the facility as the destination.

Next, the server control portion 40 controls the server communication portion 42, and transmits the control command generated in step SG4 to the in-vehicle device 12 (step SG5).

As illustrated in FIG. 8A, the control portion 20 of the in-vehicle device 12 receives the control command transmitted by the control server 10 (step SF2).

Subsequently, the control portion 20 executes the corresponding processing by executing the control command (step SF3). In the present example, in step SF3, the control portion 20 controls the cellular phone KD, and makes the cellular phone KD originate a call with the telephone number of the facility as the destination, by executing the control command.

Next, the control portion 20 shifts the operation mode from the voice operation mode M2 to the non-voice operation mode M1 (step SF4).

As above, in the input voice execution processing, the control portion 20 of the in-vehicle device 12 cooperates with the control server 10, recognizes the voice uttered based on the example phrase image Y by the passenger, and executes the corresponding processing based on a recognition result.

<Case C2>

FIGS. 9A and 9B are flowcharts illustrating the operations of the in-vehicle device 12 and the control server 10 when executing the input voice execution processing in the case that the phrase indicated by the detail example phrase image Y1 or the phrase based on the phrase indicated by the detail example phrase image Y1 is uttered by the passenger in the state that the voice corresponding user interface GU2 exemplified in FIG. 4C is displayed. FIG. 9A is the flowchart illustrating the operation of the in-vehicle device 12, and FIG. 9B is the flowchart illustrating the operation of the control server 10.

As illustrated in FIG. 9A, the control portion 20 of the in-vehicle device 12 controls the communication portion 23, and transmits the voice data inputted from the voice processing portion 27 to the control server 10 (step SH1). In the case of the present example, the voice data is generated based on the utterance by the passenger of the phrase indicated by the detail example phrase image Y1 or the phrase based on the phrase indicated by the detail example phrase image Y1.

As illustrated in FIG. 9B, the server control portion 40 of the control server 10 controls the server communication portion 42, and receives the voice data (step SI1).

Next, the server control portion 40 executes the voice recognition processing based on the received voice data, and generates the voice text data (step SI2).

Subsequently, the server control portion 40 analyzes the generated voice text data, and executes the intention estimation processing (step SI3). In the present example, in step SI3, the server control portion 40 analyzes the voice text data, discriminates that the utterance based on the detail example phrase image Y1 is performed by the passenger, and estimates that the utterance is performed by the passenger with the intention of making the more detailed evaluation of the facility be provided.

Next, the server control portion 40 communicates with the facility search server 11, acquires the facility evaluation information of the corresponding facility (Tokyo cherry tower, in the present example), and generates the voice data (referred to as "facility evaluation voice data," hereinafter) for outputting the evaluation of the facility by the voice, based on the acquired facility evaluation information (step SI4).

The voice outputted based on the facility evaluation voice data is the voice as follows for example; "An average of the evaluation of Tokyo cherry tower is three stars. Eight users wrote comments on Tokyo cherry tower. The first person wrote the comment that . . . The second person wrote the comment that . . . The eighth person wrote the comment that . . . ."

Next, the server control portion 40 controls the server communication portion 42, and transmits the facility evaluation voice data generated in step SI4 to the in-vehicle device 12 (step SI5).

As illustrated in FIG. 9A, the control portion 20 of the in-vehicle device 12 controls the communication portion 23, and receives the facility evaluation voice data transmitted by the control server 10 (step SH2).

Next, based on the received facility evaluation voice data, the control portion 20 controls the voice processing portion 27, and outputs the voice based on the facility evaluation voice data (step SH3). The passenger can acquire the evaluation of the facility without visually recognizing the touch panel 26 by listening to the voice outputted in step SH3. Here, in the case that the evaluation of the facility is expressed by a sentence, it sometimes becomes a long sentence. Therefore, a method of providing the passenger with the evaluation of the facility by displaying the evaluation of the facility on the touch panel 26 as the sentence is sometimes inappropriate as a method of providing the information by the in-vehicle device 12 loaded in the vehicle S. On the other hand, in the present embodiment, the configuration is such that the evaluation of the facility that can be the long sentence when expressed as the sentence is provided for the passenger by the voice, the passenger can acquire the evaluation of the facility without visually recognizing the touch panel 26, and the convenience of the passenger is improved.

After the voice is outputted in step SH3, the control portion 20 shifts the operation mode from the voice operation mode M2 to the non-voice operation mode M1 (step SH4).

The operation of the in-vehicle device 12 when executing the input voice execution processing is described above with the cases of the case C1 and the case C2 as the examples, however, the operation of the in-vehicle device 12 when executing the input voice execution processing is not limited to the operation exemplified above.

For example, in the above-described example, the control portion 20 of the in-vehicle device 12 is configured to execute the processing corresponding to the voice uttered by the passenger by executing the control command transmitted by the control server 10, however, it may be configured as follows. That is, the configuration may be such that a script having a function of executing the processing corresponding to the voice uttered by the passenger is implemented in the voice operation mode corresponding HTML file D2 transmitted by the control server 10, and by executing the script under the control of the control server 10, the processing corresponding to the voice uttered by the passenger is executed.

Next, the user interface displayed at the in-vehicle device 12 when the voice based on the information J22 is uttered by the passenger in the case of the state that the above-described standby screen G1 is displayed will be described. As described above, the information J22 is the information exemplifying the phrase ("listen to music") that the passenger is to utter in the case that the passenger makes the playback of the medium (assumed to be the medium with music recorded thereon) stored in the medium control portion 29 be executed.

Figure 10A:
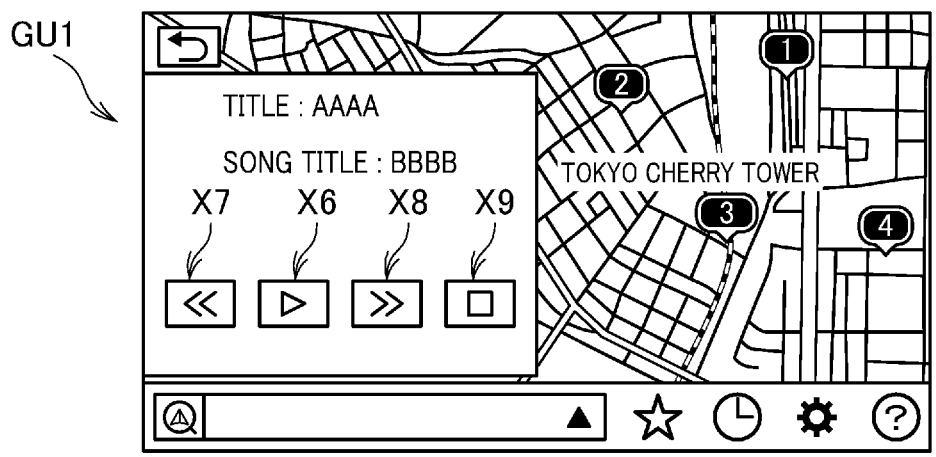
FIGS. 10A and 10B are diagrams illustrating the user interface displayed on the touch panel.
Figure 10B:
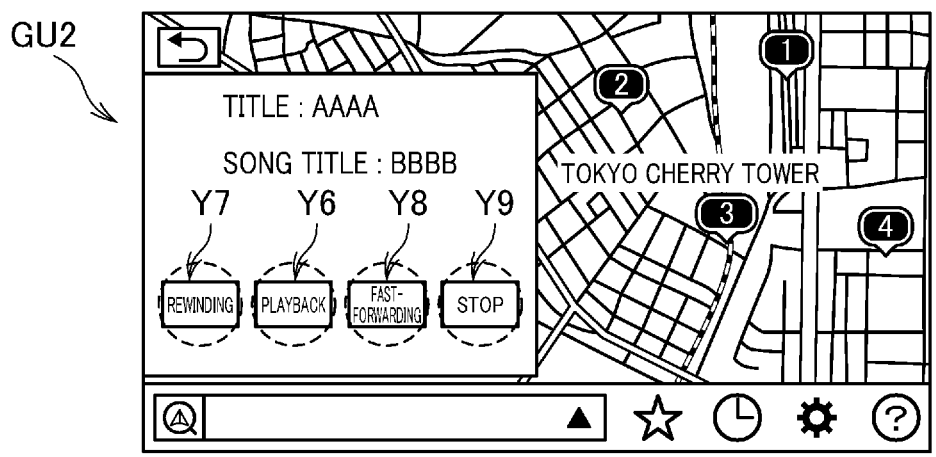

FIG. 10A is a diagram illustrating the non-voice corresponding user interface GU1 displayed on the touch panel 26 by the control portion 20 of the in-vehicle device 12, in the case that the operation mode is the non-voice operation mode M1 after the voice based on the information J22 is uttered. FIG. 10B is a diagram illustrating the voice corresponding user interface GU2 displayed on the touch panel 26 by the control portion 20 of the in-vehicle device 12, in the case that the operation mode is the voice operation mode M2 after the voice based on the information J22 is uttered.

The non-voice corresponding user interface GU1 illustrated in FIG. 10A includes, as the non-voice corresponding operation buttons X, a playback button X6, a rewinding button X7, a fast-forwarding button X8, and a stop button X9.

The playback button X6 is the non-voice corresponding operation button X to instruct the start of the playback of the medium, and the passenger can make the in-vehicle device 12 start the playback of the medium by performing the contact operation to the playback button X6. The rewinding button X7 is the non-voice corresponding operation button X to instruct rewinding of the medium to be played back, and the passenger can make the in-vehicle device 12 rewind the medium by performing the contact operation to the rewinding button X7. The fast-forwarding button X8 is the non-voice corresponding operation button X to instruct fast-forwarding of the medium to be played back, and the passenger can make the in-vehicle device 12 fast-forward the medium by performing the contact operation to the fast-forwarding button X8. The stop button X9 is the non-voice corresponding operation button X to instruct stop of the playback of the medium, and the passenger can make the in-vehicle device 12 stop the playback of the medium by performing the contact operation to the stop button X9.

On the other hand, the voice corresponding user interface GU2 illustrated in FIG. 10B includes, as the example phrase images Y, a playback example phrase image Y6, a rewinding example phrase image Y7, a fast-forwarding example phrase image Y8, and a stop example phrase image Y9.

The playback example phrase image Y6 is the example phrase image Y displayed at the position corresponding to the playback button X6 in FIG. 10A, and expresses the character string of "playback." The playback example phrase image Y6 indicates that the phrase of "playback" or the phrase based on the phrase of "playback" is to be uttered as the voice by the passenger in the case of making the playback of the medium be started.

The rewinding example phrase image Y7 is the example phrase image Y displayed at the position corresponding to the rewinding button X7 in FIG. 10A, and expresses the character string of "rewinding." The rewinding example phrase image Y7 indicates that the phrase of "rewinding" or the phrase based on the phrase of "rewinding" is to be uttered as the voice by the passenger in the case of making the rewinding of the medium be executed.

The fast-forwarding example phrase image Y8 is the example phrase image Y displayed at the position corresponding to the fast-forwarding button X8 in FIG. 10A, and expresses the character string of "fast-forwarding." The fast-forwarding example phrase image Y8 indicates that the phrase of "fast-forwarding" or the phrase based on the phrase of "fast-forwarding" is to be uttered as the voice by the passenger in the case of making the fast-forwarding of the medium be executed.

The stop example phrase image Y9 is the example phrase image Y displayed at the position corresponding to the stop button X9 in FIG. 10A, and expresses the character string of "stop." The stop example phrase image Y9 indicates that the phrase of "stop" or the phrase based on the phrase of "stop" is to be uttered as the voice by the passenger in the case of making the stop of the playback of the medium be executed.

Also for the non-voice corresponding user interface GU1 and the voice corresponding user interface GU2 exemplified in FIG. 10A and FIG. 10B, similarly to the respective user interfaces exemplified in FIG. 4B and FIG. 4C, each of the example phrase images Y is displayed at the position corresponding to each of the non-voice corresponding operation buttons X in the non-voice corresponding user interface GU1. In addition, the character string indicated by each of the example phrase images Y is expressed in the specific color (blue, in the example in FIG. 10B), and the character strings other than the character strings indicated by the example phrase images Y are expressed in the color other than the specific color. Furthermore, the character string indicated by the example phrase image Y is the character string expressing the phrase to be uttered in the case of making the corresponding processing be executed by the spoken language (colloquial expression). The effects by these are as described above.

As described above, the in-vehicle device 12 (information processing device) relating to the present embodiment includes the touch panel 26, the voice processing portion 27 that collects the voice and generates the voice data based on the collected voice, and the control portion 20 that detects the operation of the touch panel 26 and acquires the voice data generated by the voice processing portion 27. Then, the control portion 20 includes the non-voice operation mode M1 and the voice operation mode M2 as the operation modes, and in the case that the operation mode is the non-voice operation mode M1 , displays the non-voice corresponding operation buttons X (operation buttons) on the touch panel 26, and when it is detected that the non-voice corresponding operation button X is operated, executes the processing corresponding to the operated non-voice corresponding operation button X. On the other hand, in the case that the operation mode is the voice operation mode M2, the control portion 20 displays the example phrase images Y indicating the examples of the phrases that the passenger (user) is to utter in the case of making the processing corresponding to the non-voice corresponding operation button X be executed on the touch panel 26 instead of the non-voice corresponding operation buttons X, and in the case that the voice of the phrase indicated by the displayed example phrase image Y or the phrase based on the phrase indicated by the displayed example phrase image Y is collected and the voice data is generated by the voice processing portion 27, executes the processing corresponding to the non-voice corresponding operation button X based on the generated voice data.

According to the configuration, the passenger can easily and intuitively recognize what kind of the phrase is to be uttered as the voice in the case of making the in-vehicle device 12 execute desired processing, by referring to the example phrase image Y displayed instead of the non-voice corresponding operation button X, and the convenience of the passenger is improved.

In addition, in the present embodiment, in the case that the operation mode is the voice operation mode M2, the control portion 20 displays the example phrase image Y at the position corresponding to the position where the corresponding non-voice corresponding operation button X is displayed in the case of the non-voice operation mode M1, instead of the non-voice corresponding operation button X.

According to the configuration, since each of the example phrase images Y and each of the non-voice corresponding operation buttons X are displayed at the corresponding position in the respective user interfaces, the passenger can intuitively and easily recognize the relation between the non-voice corresponding operation button X and the example phrase image Y that make the same processing be executed, even when the user interface is changed, and the possibility of the utterance of an erroneous phrase can be reduced. Thus, the convenience of the passenger is improved.

Furthermore, in the present embodiment, the example phrase image Y is the image indicating the phrase in the predetermined color.

According to the configuration, the passenger can intuitively and easily recognize whether or not the character string expresses the example of the phrase to be uttered in the case of making the predetermined processing be executed by the color of the character string.

In addition, in the present embodiment, the phrase indicated by the example phrase image Y is expressed by the spoken language.

According to the configuration, the passenger can smoothly utter the phrase for making the predetermined processing be executed, by referring to the example phrase image Y.

Note that the embodiment described above just illustrates one aspect of the present invention, and arbitrary modification and application are possible within the scope of the present invention.

For example, in the embodiment described above, the example phrase image Y is the image indicating the phrase by the specific color. However, the configuration may be such that the phrase indicated by the example phrase image Y is expressed by executing other decorations such as enhanced print characters or underlines. Also in the configuration, the passenger (user) can intuitively and easily recognize whether or not the character string expresses the example of the phrase to be uttered in the case of making the predetermined processing be executed, based on the decorations executed to the character string.

In addition, in the embodiment described above, the configuration may be such that a part or all of the processing described as being executed by the control server 10 is executed by the in-vehicle device 12. For example, in the embodiment described above, the control server 10 executes the voice recognition processing and the intention estimation processing, however, the configuration may be such that the in-vehicle device 12 executes the processing. Furthermore, in the embodiment described above, the configuration is such that the control server 10 generates the HTML file relating to the user interface displayed on the touch panel 26 and the in-vehicle device 12 displays the user interface based on the HTML file. It may be changed to the configuration that the in-vehicle device 12 generates the image data (may not be the HTML file) for displaying the user interface, and displays the user interface based on the generated image data.

In addition, for processing units of the flowcharts illustrated in the drawings, the processing of the respective devices is divided according to main processing content in order to facilitate understanding. The present claimed invention is not limited by the way of division and the names of the processing units. The processing of the respective devices can be divided into many more processing units according to the processing content. In addition, the processing can be also divided so that the one processing unit includes further more processing. In addition, as long as the similar processing can be performed, a processing order of the flowchart described above is not limited to the illustrated example.

REFERENCE SIGNS LIST

12 In-vehicle device (information processing device)
20 Control portion
26 Touch panel
27 Voice processing portion

The invention claimed is:

1. An information processing device comprising:
a touch panel;
a voice processing portion that collects voice and generates voice data based on the collected voice; and
a control portion having a CPU that detects an operation to the touch panel and acquires the voice data generated by the voice processing portion, and
wherein the control portion is provided with a non-voice operation mode and a voice operation mode as operation modes, and
in the case that the operation mode is the non-voice operation mode,
displays a first operation button on the touch panel, and when the control portion detects that the first operation button is touch-operated, executes processing corresponding to the operated first operation button,
the first operation button is displayed with a character string image indicating an example of a phrase expressed by a written language that a user is to touch to execute processing corresponding to the first operation button, and
in the case that the operation mode is the voice operation mode,
displays a second operation button, which is capable of being operated by a voice operation,
the second operation button is displayed with an example phrase image indicating an example of a phrase expressed by a spoken language that the user is to utter to execute processing corresponding to the second operation button, the example phrase image displayed on the second operation button is highlighted to differentiate from the character string image displayed on the first operation button which is not capable of being operated by the voice operation, and
when the voice of the phrase indicated by the displayed example phrase image or a phrase based on the phrase indicated by the displayed example phrase image is collected and the voice data is generated by the voice processing portion, executes the processing corresponding to the second operation button based on the generated voice data.

2. The information processing device according to claim 1,
wherein in the case that the operation mode is the voice operation mode,
the control portion displays the example phrase image at a position corresponding to a position where the first operation button is displayed in the case of the non-voice operation mode.

3. The information processing device according to claim 1,
wherein the example phrase image is an image indicating a phrase to which a predetermined decoration is applied.

4. The information processing device according to claim 3,
wherein the example phrase image is an image indicating a phrase in a predetermined color.

5. The information processing device according to claim 1, wherein the information processing device is a device loaded in a vehicle.

6. An information processing method comprising:
in the case that an operation mode is a non-voice operation mode,
displaying a first operation button on a touch panel, and when the control portion detects that the first operation button is touch-operated, executing processing corresponding to the operated first operation button,
displaying the first operation button with a character string image indicating an example of a phrase expressed by a written language that a user is to touch to execute processing corresponding to the first operation button, and
in the case that the operation mode is a voice operation mode,
displaying a second operation button, which is capable of being operated by a voice operation,
displaying the second operation button with an example phrase image indicating an example of a phrase expressed by a spoken language that the user is to utter to execute processing corresponding to the second operation button, the example phrase image displayed on the second operation button is highlighted to differentiate from the character string image displayed on the first operation button which is not capable of being operated by the voice operation, and
when voice of the phrase indicated by the displayed example phrase image or a phrase based on the phrase indicated by the displayed example phrase image is collected and voice data is generated by a voice processing portion that collects the voice and generates the voice data based on the collected voice, executing the processing corresponding to the second operation button based on the generated voice data.

7. The information processing method according to claim 6, further comprising:
in the case that the operation mode is the voice operation mode,
displaying the example phrase image at a position corresponding to a position where the first operation button is displayed in the case of the non-voice operation mode.

8. The information processing method according to claim 6,
wherein the example phrase image is an image indicating a phrase to which a predetermined decoration is applied.

9. The information processing method according to claim 8,
wherein the example phrase image is an image indicating a phrase in a predetermined color.

* * * * *